(12) United States Patent
Ashford

(10) Patent No.: US 8,876,037 B2
(45) Date of Patent: Nov. 4, 2014

(54) ROTORCRAFT COUNTER-TORQUE CONTROL ASSEMBLY AND METHOD

(75) Inventor: Curtis M. Ashford, St. Peters, MO (US)

(73) Assignee: The Boeing Company, Chicago, IL (US)

( * ) Notice: Subject to any disclaimer, the term of this patent is extended or adjusted under 35 U.S.C. 154(b) by 452 days.

(21) Appl. No.: 13/342,937

(22) Filed: Jan. 3, 2012

(65) Prior Publication Data
US 2013/0168490 A1 Jul. 4, 2013

(51) Int. Cl.
*B64C 27/82* (2006.01)

(52) U.S. Cl.
USPC ........................................................ 244/17.19

(58) Field of Classification Search
USPC .................. 244/17.11, 17.19, 17.23 D, 17.52
See application file for complete search history.

(56) References Cited

U.S. PATENT DOCUMENTS

| | | | |
|---|---|---|---|
| 2,486,272 | A | 10/1949 | Gazda |
| 2,518,697 | A | 8/1950 | Lee |
| 3,015,460 | A | 1/1962 | Christenson |
| 3,957,226 | A | 5/1976 | Daggett, Jr. et al. |
| 4,660,785 | A * | 4/1987 | Munski ............... 244/17.19 |
| 5,232,183 | A | 8/1993 | Rumberger |
| 5,934,608 | A | 8/1999 | Dockter |
| 6,021,976 | A * | 2/2000 | Exter .................. 244/17.19 |
| 6,036,141 | A | 3/2000 | Clay |
| 7,334,755 | B2 | 2/2008 | Svoboda, Jr. |
| 7,731,121 | B2 | 6/2010 | Smith et al. |
| 8,615,980 | B2 * | 12/2013 | Agrawal et al. ........... 60/39.15 |
| 2006/0027704 | A1 * | 2/2006 | Dickau ................ 244/23 D |

FOREIGN PATENT DOCUMENTS

| | | |
|---|---|---|
| GB | 606420 A | 8/1948 |
| WO | 9705016 A1 | 2/1997 |

OTHER PUBLICATIONS

Rohit Jaggi, "Helicopters: Hybrid makes speedy entrance in new class", FT.com, Financial Times Online, Jun. 19, 2011, 3 pages.
Daniel Michaels et al., "Helicopter Manufacturers Develop a Need for Speed", WSJ.com, Wall Street Journal Online, Jun. 20, 2011, 5 pages.
JETCAT USA Web Pages, current as of Jan. 2, 2012, from Internet website at web address http://www.jetcatusa.com/, 2 pages.
US Microjet LLC Web Pages, current as of Jan. 2, 2012, from Internet website at web address http://usmicrojetllc.thomasnet.com/item/all-categories/custom-applications-including-sustainer-engines/item-1010?&forward=1#, 2 pages.
JETBEETLE Web Pages, current as of Jan. 2, 2012, last updated Nov. 9, 2011, from Internet website at web address http://www.jetbeetle.com/, 3 pages.
European Patent Office Extended Search Report for Counterpart Application EP12191824.7-1754, Issued May 3, 2013, 6 pages.

* cited by examiner

*Primary Examiner* — Brian M O'Hara

(57) ABSTRACT

There is provided a counter-torque control assembly for mounting to a tail boom of a rotorcraft where the rotorcraft has a single main rotor, no tail rotor, and no tail fin. The assembly has an air intake chamber with at least a first opening for receiving an air flow stream and a vane assembly housed within the air intake chamber. The vane assembly has at least two vane elements capable of counter-rotation in the air flow stream. The assembly further has one or more microjet propulsion devices coupled to a second end of the air intake chamber. The one or more microjet propulsion devices draw the air flow stream over the vane elements to generate a counter-torque force to counter a torque from the single main rotor.

20 Claims, 14 Drawing Sheets

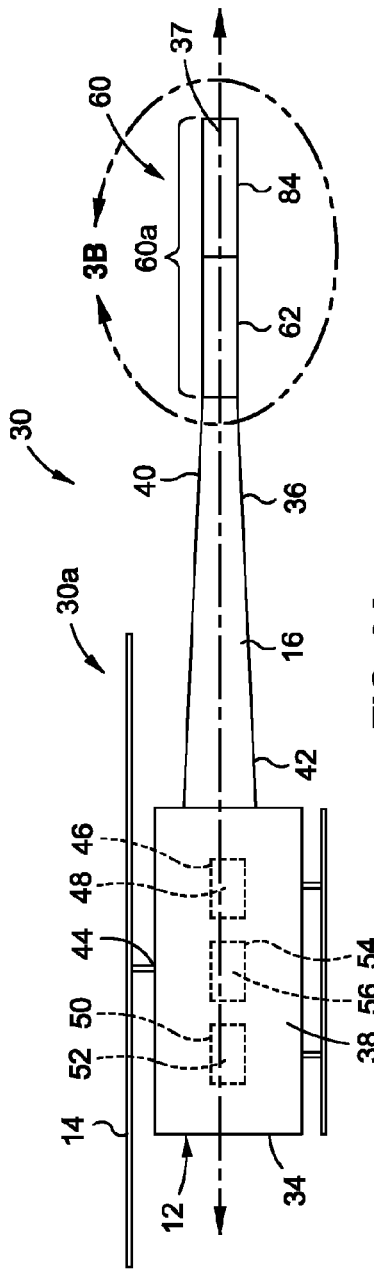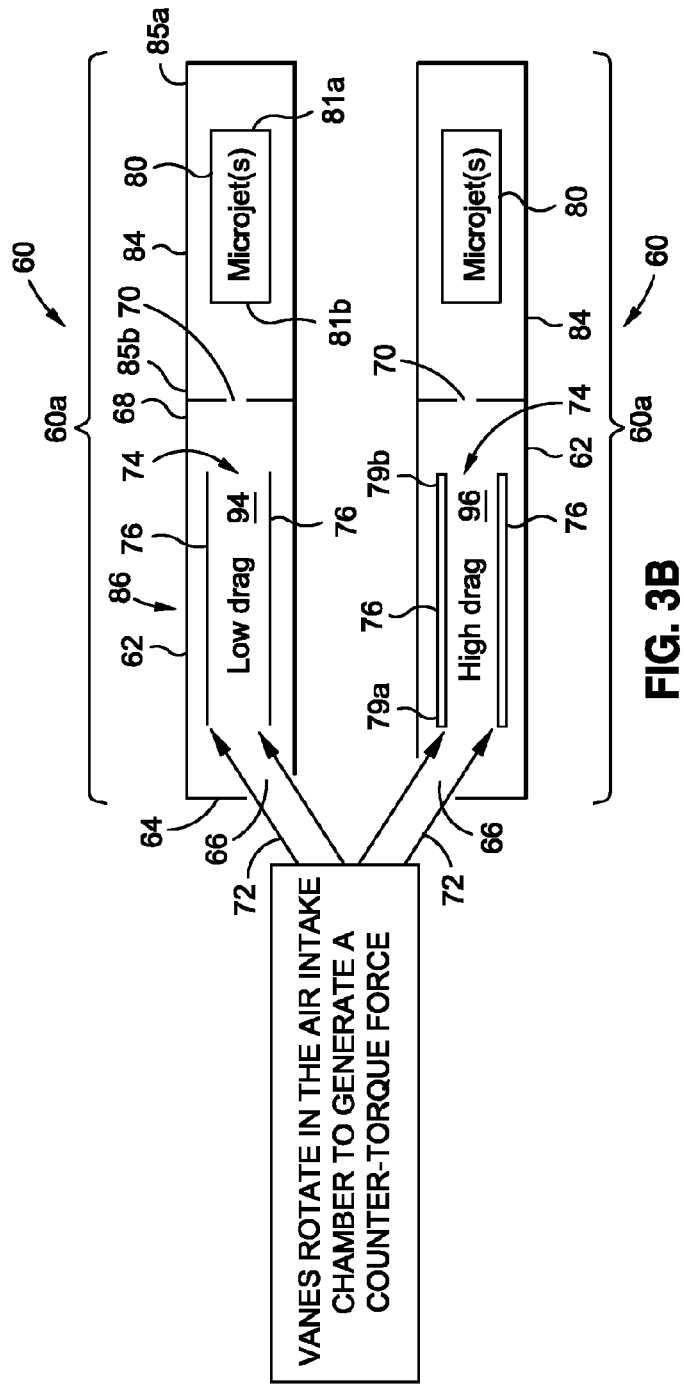

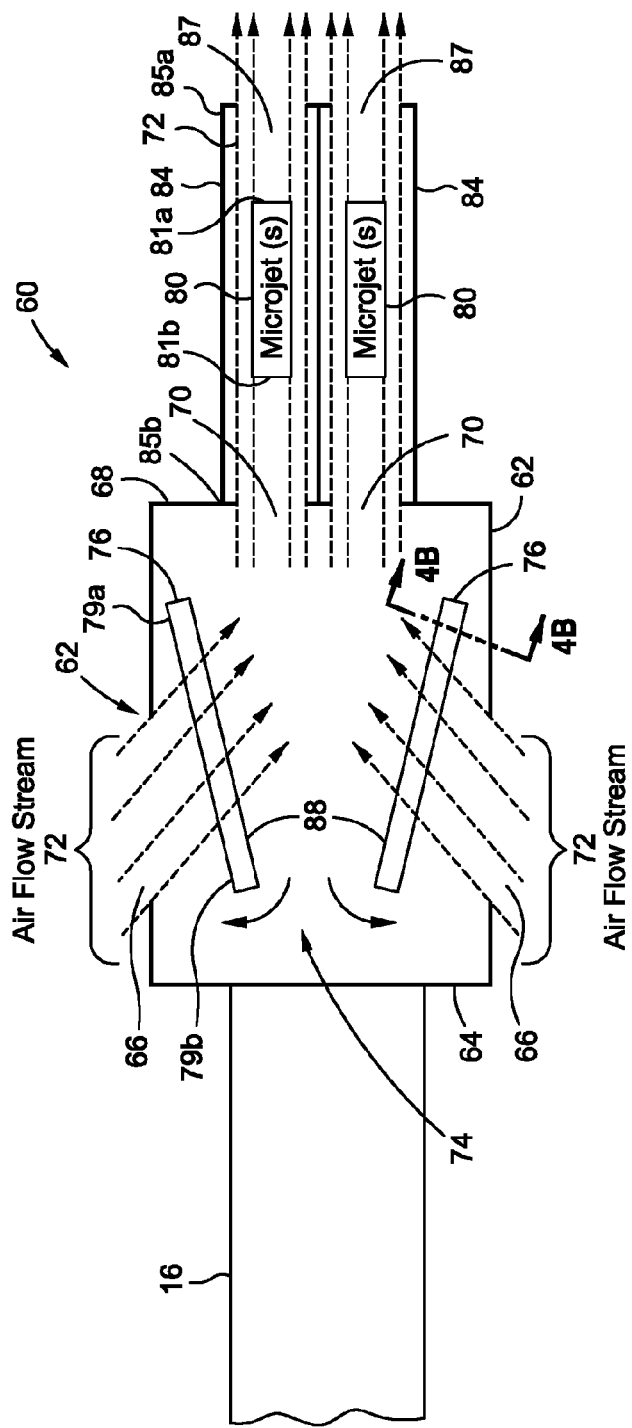
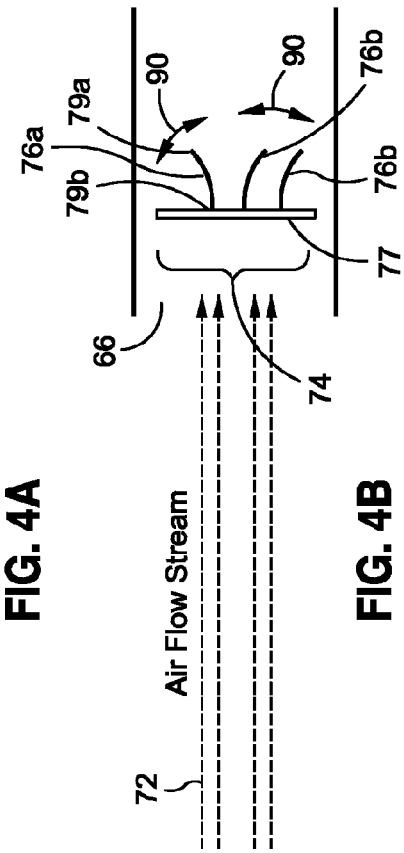
FIG. 4A
FIG. 4B

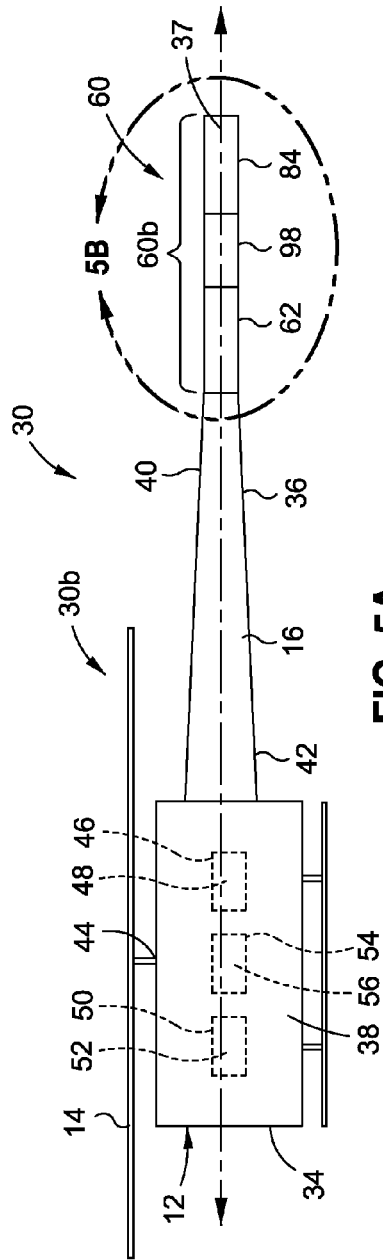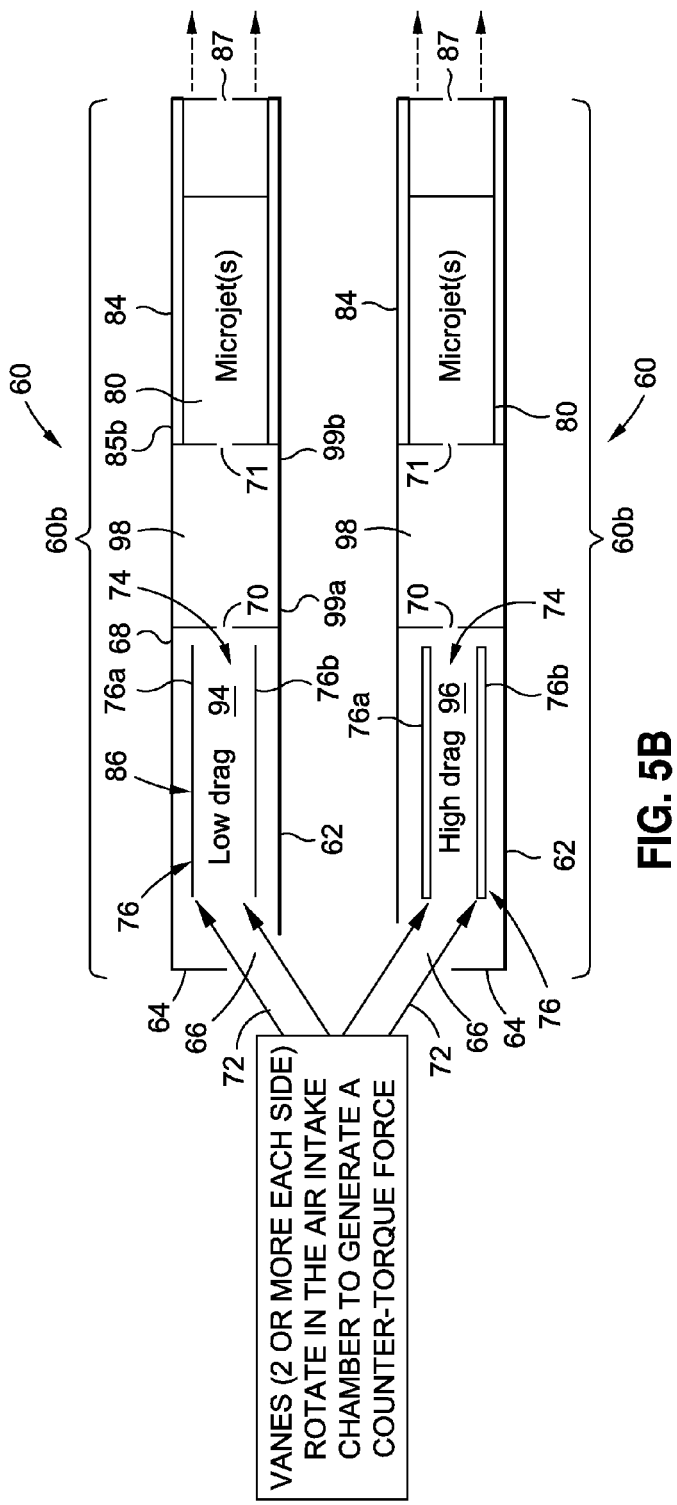
FIG. 5A
FIG. 5B

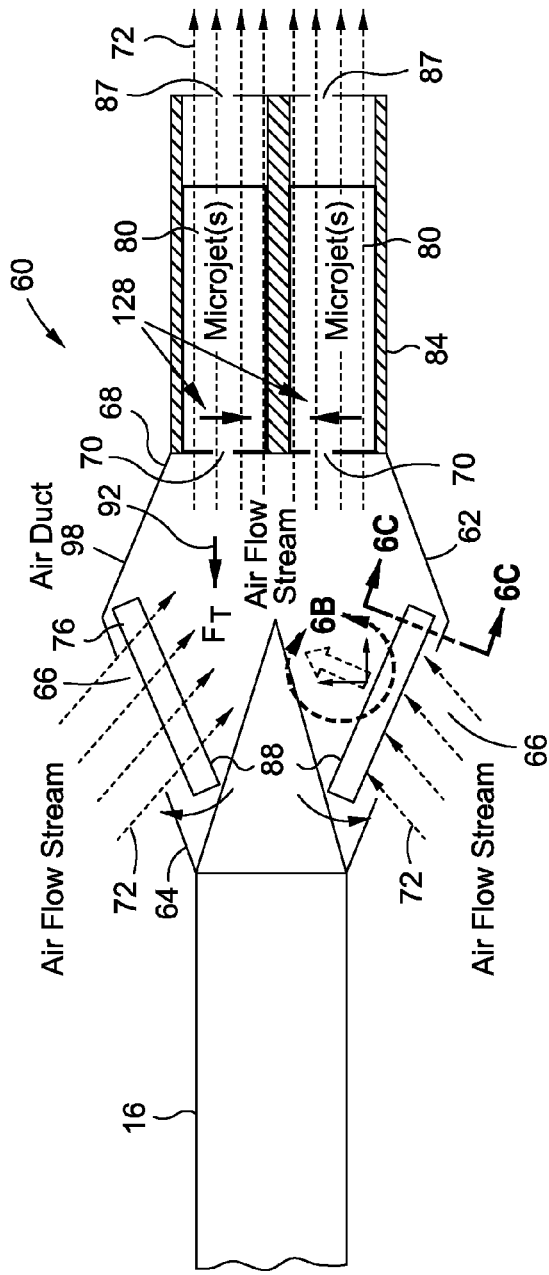
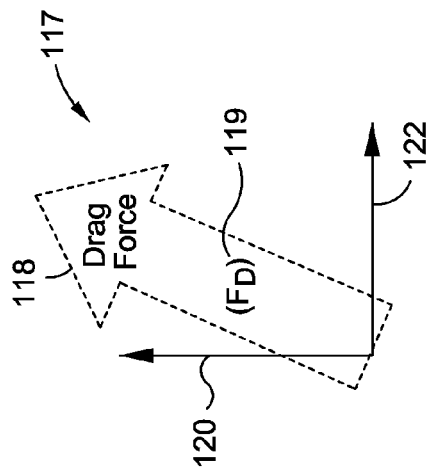
FIG. 6A
FIG. 6B

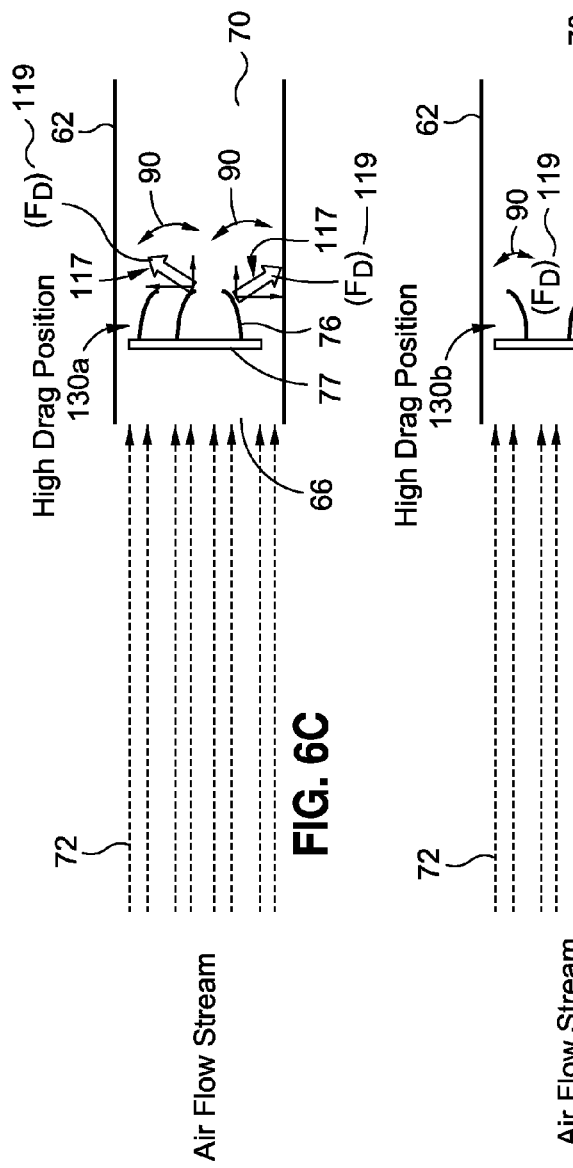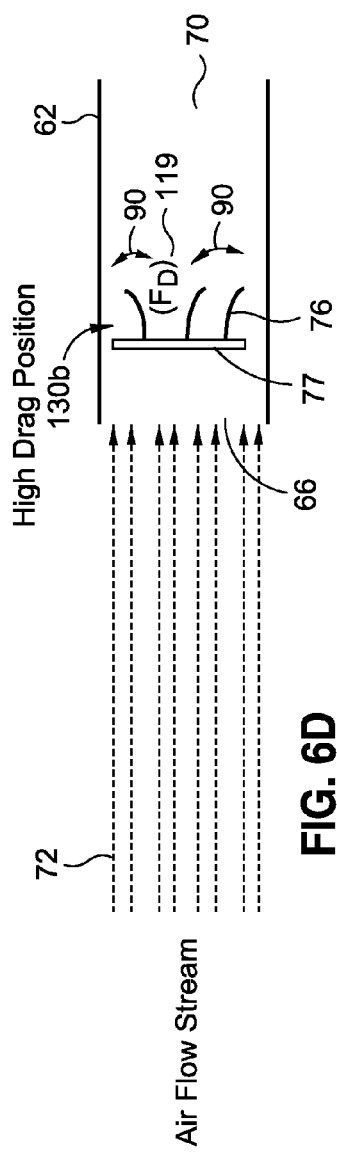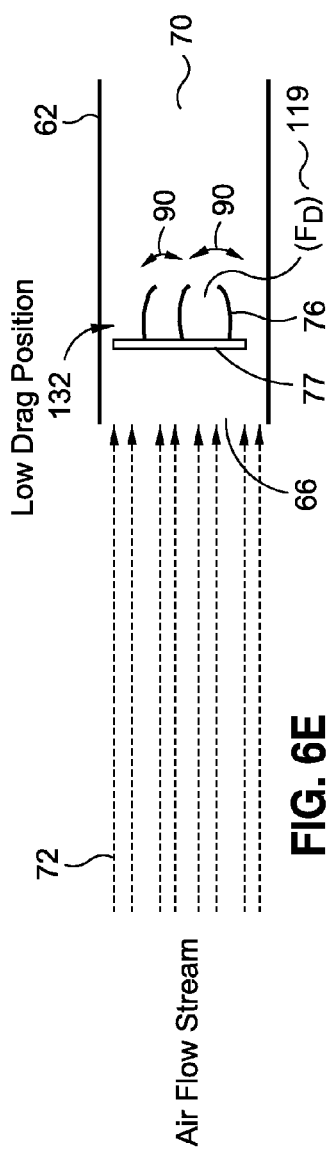

ROTORCRAFT COUNTER-TORQUE CONTROL ASSEMBLY AND METHOD

BACKGROUND

1) Field of the Disclosure

The disclosure relates generally to assemblies and methods for rotorcraft, and more particularly, to assemblies and methods for counter-torque control for rotorcraft such as helicopters.

2) Description of Related Art

Rotorcraft or rotary aircraft, such as helicopters, are versatile vehicles for transporting supplies, passengers and cargo over moderate distances at relatively high speeds. They are capable of vertical lift and forward propulsion without the need of a runway, unlike most other passenger and cargo transporting style aircraft, such as propeller-style airplanes and jet aircraft with a main fixed aircraft lifting wing.

Such rotorcraft or rotary aircraft typically fly by means of thrust created by rotation of a main rotor having blades or rotor/wings driven by a rotating shaft that rotates about a generally vertical axis above the airframe of the rotorcraft. When the main rotor rotates, a torque is produced that must be counteracted by a counter-torque that opposes and compensates for the torque of the main rotor to prevent the main rotor turning in one direction and the rotorcraft airframe turning in an opposite direction.

Known solutions exist for counteracting the torque produced by the main rotor. For example, in a rotorcraft having a single main rotor, counter-torque and directional control may be achieved by mounting a tail rotor having smaller rotor blades on the rotorcraft tail. The tail rotor rotates about a generally horizontal axis and produces a sideways thrust that prevents the rotorcraft airframe from rotating. However, due to location and exposure of the tail rotor, during rotation, the tail rotor may be susceptible to tail rotor strikes against various objects or surfaces if the tail rotor inadvertently gets too close and makes contact with such objects and surfaces. In addition, due to the tail rotor being exposed, rotorcraft aerodynamic performance may be compromised. Moreover, tail rotors may produce a considerable amount of noise during rotation.

In addition, known solutions requiring no tail rotor exist for counteracting the torque produced by the main rotor. For example, rotorcraft exist having two main rotors that turn in opposite, or counter-rotating, directions. Because each main rotor neutralizes or cancels the torque produced by the other main rotor, no tail rotor is needed in this type of rotorcraft. Such rotorcraft may include, for example, rotorcraft with a coaxial rotor design having one main rotor located on top of the other main rotor, rotorcraft with a twin-rotor or tandem rotor design having one main rotor located side-by-side to the other main rotor, rotorcraft with a tiltrotor design having helicopter-like rotors attached at wingtips, and rotorcraft with a twin-rotor synchropter design having one main rotor that meshes into another main rotor like a gearwheel. However, due to both main rotors being exposed, the rotorcraft aerodynamic performance of such rotorcraft designs may be compromised. Moreover, the two main rotor blades of such known rotorcraft may produce a considerable amount of noise during rotation.

Accordingly, there is a need in the art for improved rotorcraft assemblies and methods that require no tail rotor, that counteract the torque produced by the main rotor, and that provide advantages over known assemblies and methods.

SUMMARY

This need for improved rotorcraft assemblies and methods that require no tail rotor and that counteract the torque produced by the main rotor is satisfied. As discussed in the below detailed description, embodiments of such improved rotorcraft assemblies and methods may provide significant advantages over existing devices and methods.

In one embodiment there is provided a counter-torque control assembly for mounting to a tail boom of a rotorcraft where the rotorcraft has a single main rotor, no tail rotor and no tail fin. The assembly comprises an air intake chamber comprising a first end configured for attachment to a tail boom of a rotorcraft having a single main rotor, no tail rotor and no tail fin. The air intake chamber further comprises at least a first opening for receiving an air flow stream. The assembly further comprises a vane assembly housed within the air intake chamber. The vane assembly comprises at least two vane elements capable of counter-rotation in the air flow stream. The assembly further comprises one or more microjet propulsion devices coupled to a second end of the air intake chamber. The one or more microjet propulsion devices draw the air flow stream over the vane elements to generate a counter-torque force to counter a torque from the single main rotor.

In another embodiment there is provided a rotorcraft with improved aerodynamic properties and having no tail rotor and no tail fin. The rotorcraft comprises an airframe extending from a cabin at a forward end to a tail boom at an aft end. The rotorcraft further comprises a single main rotor attached to and extending from a top portion of the airframe. The rotorcraft further comprises a primary propulsion system located in a first portion of the airframe. The rotorcraft further comprises a flight control system located in a second portion of the airframe. The rotorcraft further comprises a power system located in a third portion of the airframe. The rotorcraft further comprises a counter-torque control assembly mounted to the tail boom. The assembly comprises an air intake chamber comprising a first end configured for attachment to the tail boom. The air intake chamber further comprises at least a first opening for receiving an air flow stream. The assembly further comprises a vane assembly housed within the air intake chamber, the vane assembly comprising at least two vane elements capable of counter-rotation in the air flow stream. The assembly further comprises one or more microjet propulsion devices coupled to a second end of the air intake chamber. The one or more microjet propulsion devices draws the air flow stream over the vane elements to generate a counter-torque force to counter a torque from the single main rotor.

In another embodiment there is provided a method for improving aerodynamic properties of a rotorcraft by eliminating a tail rotor and a tail fin. The method comprises mounting a counter-torque control assembly to a tail boom of a rotorcraft having a single main rotor, no tail rotor and no tail fin. The counter-torque control assembly comprises an air intake chamber, a vane assembly housed within the air intake chamber, the vane assembly comprising at least two vane elements, and one or more microjet propulsion devices coupled to the air intake chamber. The method further comprises rotating the single main rotor resulting in generation of a torque. The method further comprises flowing an air flow stream from the rotorcraft into the air intake chamber. The method further comprises counter-rotating the vane elements in the air flow stream in the air intake chamber. The method further comprises drawing the air flow stream over the vane elements with the one or more microjet propulsion devices to generate a counter-torque force to counter the torque from the single main rotor, resulting in the rotorcraft having improved aerodynamic properties without a need for a tail rotor and a tail fin.

The features, functions, and advantages that have been discussed can be achieved independently in various embodiments of the disclosure or may be combined in yet other embodiments further details of which can be seen with reference to the following description and drawings.

BRIEF DESCRIPTION OF THE DRAWINGS

The disclosure can be better understood with reference to the following detailed description taken in conjunction with the accompanying drawings which illustrate preferred and exemplary embodiments, but which are not necessarily drawn to scale, wherein:

FIG. 3A is an illustration of a schematic side view of a rotorcraft incorporating an embodiment of a counter-torque control assembly of the disclosure;

FIG. 3B is an illustration of a close-up side view of the circled portion 3B of FIG. 3A showing an embodiment of the counter-torque control assembly of the disclosure;

FIG. 4A is an illustration of a schematic top view of an embodiment of the counter-torque control assembly of the disclosure;

FIG. 4B is an illustration of a cross-sectional view taken along lines 4B-4B of FIG. 4A;

FIG. 5A is an illustration of a schematic side view of a rotorcraft incorporating another embodiment of a counter-torque control assembly of the disclosure;

FIG. 5B is an illustration of a close-up side view of the circled portion 5B of FIG. 5A showing another embodiment of the counter-torque control assembly of the disclosure;

FIG. 6A is an illustration of a schematic top view of another embodiment of the counter-torque control assembly of the disclosure;

FIG. 6B is an illustration of a schematic close-up side view of the circled portion 6B of FIG. 6A showing a force vector configuration;

FIG. 6C is an illustration of a cross-sectional view taken along lines 6C-6C of FIG. 6A showing a high drag position;

FIG. 6D is an illustration of an alternate configuration of FIG. 6C showing another embodiment of a high drag position;

FIG. 6E is an illustration of another alternate configuration of FIG. 6C showing an embodiment of a low drag position;

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and complete and will fully convey the scope of the disclosure to those skilled in the art.

Figure 1:
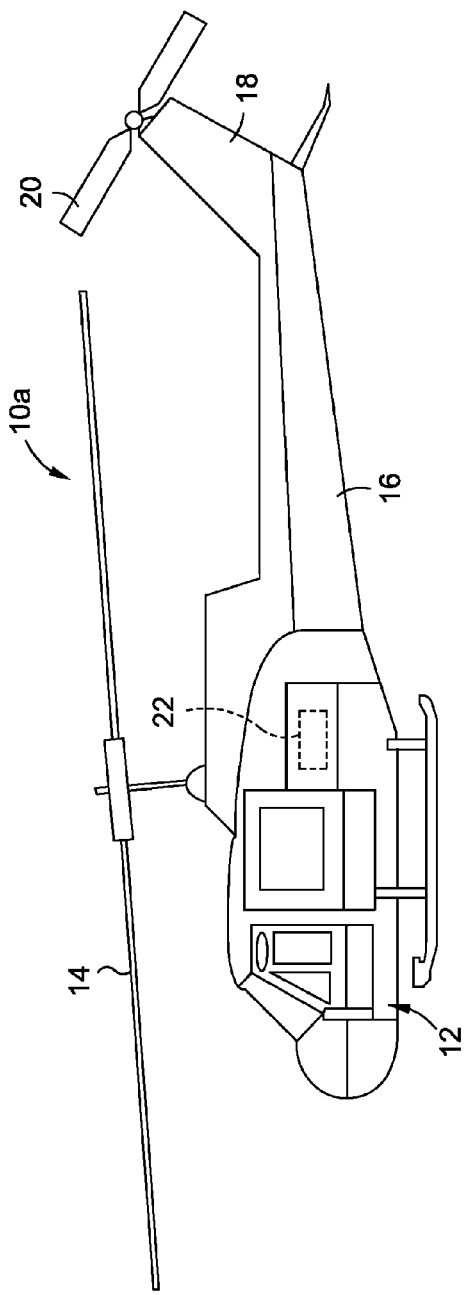
FIG. 1 is an illustration of a perspective side view of a known rotorcraft having a tail rotor and a tail fin.
Figure 2:
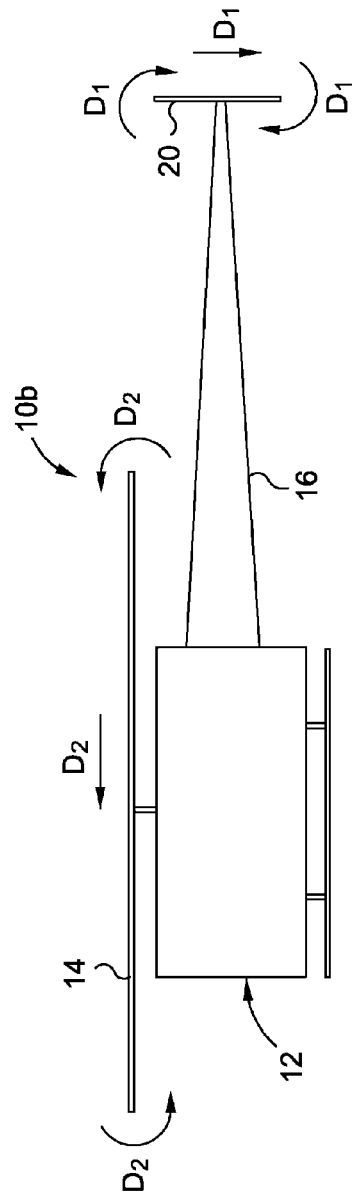
FIG. 2 is an illustration of a schematic side view of a known rotorcraft having a tail rotor but no tail fin.

Now referring to the Figures, FIG. 1 is an illustration of a perspective side view of a known rotorcraft 10a, such as a helicopter. As shown in FIG. 1, the rotorcraft 10a has an airframe 12, a single main rotor 14, a tail boom 16, a tail fin 18, a tail rotor 20, and a propulsion system 22. FIG. 2 is an illustration of a schematic side view of another known rotorcraft 10b. As shown in FIG. 2, the rotorcraft 10a has an airframe 12, a single main rotor 14, a tail boom 16, and a tail rotor 20 but has no tail fin. As shown in FIG. 2, the tail rotor 20 rotates in a vertical direction $D_1$ and the single main rotor 14 rotates in a horizontal direction $D_2$. When the single main rotor 14 rotates, a torque 58 (see FIGS. 8A-9B) is produced by the single main rotor 14 that is counteracted by a counter-torque of the tail rotor 20, that is, a torque that opposes and compensates for the torque of the single main rotor 14. For purposes of this application, "torque" is defined as a measure of how much a force, such as rotational force, acting on an object causes that object to rotate.

FIG. 3A is an illustration of a schematic side view of a rotorcraft 30, in the form of rotorcraft 30a, incorporating in one embodiment, a counter-torque control assembly 60, in the form of counter-torque control assembly 60a. As shown in FIG. 3A, the rotorcraft 30, in the form of rotorcraft 30a, comprises an airframe 12 having a forward end 34 and an aft end 36, and a rotorcraft centerline 37 extending through the rotorcraft 30a. The rotorcraft 30, in the form of rotorcraft 30a, further comprises a cabin 38 and a tail boom 16 extending behind the cabin 38. The tail boom 16 has an aft end 40 and a forward end 42. The rotorcraft 30 preferably has a single main rotor 14 and no tail rotor and no tail fin. The single main rotor 14 is attached to and extends from a top portion 44 of the airframe 12 above the cabin 38. The airframe 12 of the rotorcraft 30, in the form of rotorcraft 30a, further comprises a first portion 46 having a primary propulsion system 48, such as a primary engine 49 (see FIG. 9A), a second portion 50 having a flight control system 52 and a third portion 54 having a power system 56, such as an electrical power system 57 (see FIG. 9A) or another suitable power system. The rotorcraft 30 may be made from composite and/or metallic materials that may be used on such portions of the rotorcraft 30, including but not limited to, the airframe 12, the single main rotor 14, and the tail boom 16.

As shown in FIG. 3A, the rotorcraft 30, in the form of rotorcraft 30a, further comprises in one embodiment, a counter-torque control assembly 60, in the form of counter-torque control assembly 60a, mounted to the aft end 40 of the tail boom 16. The counter-torque control assembly 60a comprises an air intake chamber 62 and one or more microjet propulsion device housings 84. The counter-torque control assembly 60 preferably eliminates a need for a tail rotor 20 (see FIGS. 1, 2) and a tail fin 18 (see FIG. 1) on the rotorcraft 30, which, in turn results in improved aerodynamic properties 32 (see FIGS. 8A-9B) of the rotorcraft 30.

FIG. 3B is an illustration of a close-up side view of the circled portion 3B of FIG. 3A showing the counter-torque control assembly 60, in the form of counter-torque control assembly 60a. The air intake chamber 62 comprises a first end 64 configured for attachment to the tail boom 16 of the rotorcraft 30. The air intake chamber 62 preferably has at least one first opening 66 for receiving an air flow stream 72 (see also FIG. 4A). The air intake chamber 62 further comprises a second end 68 with at least one second opening 70 (see also FIG. 4A) for the air flow stream 72 to exit from the air intake chamber 62. As shown in FIG. 3B, the air intake chamber 62 preferably houses a vane assembly 74 comprising at least two vane elements 76 and one or more mechanical linkages 77 (see FIG. 4B), such as one or more hydraulic actuators, a rotational actuator, or another suitable mechanical linkage, for mechanically linking the vane elements 76. The vane assembly 74 may further comprise various attachment components (not shown) known in the art for attaching the vane assembly 74 within the air intake chamber 62. The vane elements 76 are capable of counter-rotation 78 (see FIG. 9A) in the air flow stream 72. Each vane element 76 has a first end 79a (see FIGS. 4A-4B) and a second end 79b (see FIGS. 4A-4B) and may be made of a rigid metal material, a rigid composite material, or another suitable rigid material. The vane elements 76 may be coupled at the second end 79b to the one or more mechanical linkages 77 (see FIG. 4B) which may be used to independently move the upper vane element 76a and lower vane elements 76b (see FIG. 4B) to adjustable positions 90 (see FIG. 4B). There may be two or more vane elements 76 on each side of the air intake chamber 62. As shown in FIG. 3B, the vane elements 76 may be positioned in a parallel position 86 (see FIGS. 8B, 9B) with respect to each other within the air intake chamber 62 and with respect to the rotorcraft centerline 37 (see FIG. 3A). The vane elements 76 counter-rotate in the air intake chamber 62 to generate a counter-torque force 82 (see FIGS. 8A-9B), and the vane elements 76 may be at a low drag 94 (see FIG. 3B) or at a high drag 96 (see FIG. 3B) depending on the position of the vane elements 76 in the air flow stream 72. For purposes of this application, "drag" is defined as the aerodynamic drag, this being a fluid drag force that is generated as a fluid flows over any solid body, in this case, the solid body being vane elements 76, in a fluid freestream flow, in this case, the air flow stream 72. Drag is a force ($F_D$) (see FIG. 6B) and a vector quantity having both a magnitude and a direction.

In another embodiment, as shown in FIG. 4A, the vane elements 76 may be in a canted position 88 with respect to each other and with respect to the rotorcraft centerline 37 (see FIG. 3A) to counter or counteract a thrust force 92 (see FIG. 9A) from the one or more microjet propulsion devices 80. FIG. 4A is an illustration of a schematic top view of an embodiment of the counter-torque control assembly 60 with the vane elements 76 in the canted position 88. The air flow stream 72 flows into the air intake chamber 62 via first openings 66. The air flow stream 72 flows over the vane elements 76, through the air intake chamber 62 and out the second openings 70 to the one or more microjet propulsion devices 80 housed in the one or more microjet propulsion device housings 84. The air flow stream 72 then flows through the one or more microjet propulsion devices 80 and out the one or more openings 87. FIG. 4B is an illustration of a cross-sectional view taken along lines 4B-4B of FIG. 4A. FIG. 4B shows the air flow stream 72 flowing toward the vane assembly 74 through first opening 66. The second end 79b of each vane element 76 may be coupled to the one or more mechanical linkages 77, and the first end 79a of each vane element 76 is free to move in an adjustable position 90 to achieve an increased drag force ($F_D$) 119 (see FIG. 4B) due to the air flow stream 72 being drawing through the one or more microjet propulsion devices 80 (see FIG. 4A).

As shown in FIG. 3B, the counter-torque control assembly 60, in the form of counter-torque control assembly 60a, further comprises one or more microjet propulsion devices 80 housed within one or more microjet propulsion device housings 84. Each microjet 80 has a first end 81b (see FIG. 3B) and a second end 81a (see FIG. 3B). Each microjet propulsion device housing 84 has a first end 85b (see FIG. 4A) and a second end 85a (see FIG. 4A). The one or more microjet propulsion device housings 84 preferably have sufficiently thick walls and preferably sufficiently enclose the one or more microjet propulsion devices 80 to minimize any noise generated by the one or more microjet propulsion devices 80 during flight or operation of the rotorcraft 30.

Figure 10:
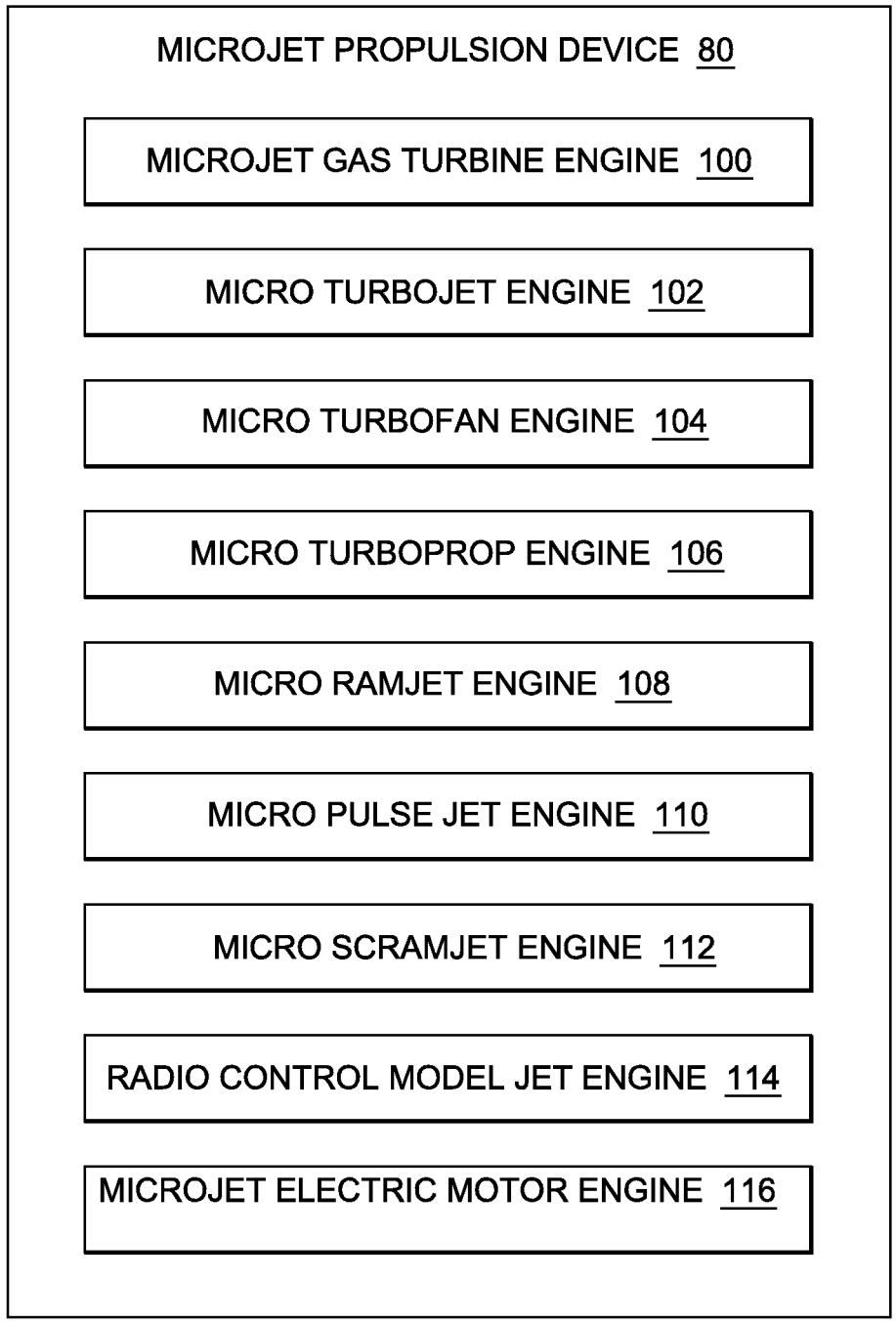
FIG. 10 is an illustration of a block diagram showing various microjet propulsion devices that may be used in embodiments of the counter-torque control assembly of the disclosure.

As shown in FIG. 4A, preferably, the first end 85b of the one or more microjet propulsion device housings 84 and/or the first end 81b of the one or more microjet propulsion devices 80 are coupled to or adjacent to a second end 68 of the air intake chamber 62. The one or more microjet propulsion devices 80 draws the air flow stream 72 over the vane elements 76 to generate the counter-torque force 82 (see FIG. 8A) to counter or counteract the torque 58 (see FIG. 8A) from the single main rotor 14. As shown in FIG. 10, the one or more microjet propulsion devices 80 may preferably comprise a microjet gas turbine engine 100, a micro turbojet engine 102, a micro turbofan engine 104, a micro turboprop engine 106, a micro ramjet engine 108, a micro pulse jet engine 110, a micro scramjet engine 112, a radio control model jet engine 114, and a microjet electric motor engine 116.

FIG. 5A is an illustration of a schematic side view of a rotorcraft 30, in the form of rotorcraft 30b, incorporating another embodiment of a counter-torque control assembly 60, in the form of counter-torque control assembly 60b. As shown in FIG. 5A, the rotorcraft 30, in the form of rotorcraft 30b, comprises the airframe 12 having the forward end 34 and the aft end 36, the cabin 38, the tail boom 16 extending behind the cabin 38, and the rotorcraft centerline 37 extending through the rotorcraft 30b. The tail boom 16 has the aft end 40 and the forward end 42. The rotorcraft 30 preferably has the single main rotor 14 and no tail rotor and no tail fin. The single main rotor 14 is attached to and extends from the top portion 44 of the airframe 12 above the cabin 38. The airframe 12 of the rotorcraft 30, in the form of rotorcraft 30a, further comprises the first portion 46 having the primary propulsion system 48, such as a primary engine 49 (see FIG. 9A) or another suitable primary propulsion system, the second portion 50 having the flight control system 52, and the third portion 54 having the power system 56, such as an electrical power system 57 (see FIG. 9A) or another suitable power system.

The rotorcraft 30, in the form of rotorcraft 30b, further comprises in another embodiment, a counter-torque control assembly 60, in the form of counter-torque control assembly 60b, mounted to the aft end 40 of the tail boom 16. The counter-torque control assembly 60b comprises an air intake chamber 62, one or more microjet propulsion device housings 84, and an air duct 98 positioned between the air intake chamber 62 and the one or more microjet propulsion device housings 84. As shown in FIG. 5B, the air duct 98 has a first end 99a and a second end 99b. The first end 99a of the air duct 98 is adjacent to or coupled to the second end 68 of the air intake chamber 62. The second end 99b of the air duct 98 is adjacent to or coupled to the first end 85b of the microjet propulsion device housings 84.

FIG. 5B is an illustration of a close-up side view of the circled portion 5B of FIG. 5A showing the counter-torque control assembly 60, in the form of counter-torque control assembly 60b. As shown in FIG. 5B, the air intake chamber 62 preferably has at least one first opening 66 for receiving the air flow stream 72. The air intake chamber 62 further comprises the second end 68 with the at least one second opening 70 for the air flow stream 72 to exit from the air intake chamber 62. As shown in FIG. 5B, the air intake chamber 62 preferably houses the vane assembly 74 comprising at least two vane elements 76 and the one or more mechanical linkages 77 (see FIG. 4B). The vane assembly 74 may further comprise various attachment components (not shown) known in the art for attaching the vane assembly 74 within the air intake chamber 62. The vane elements 76 are capable of independent counter-rotation 78 (see FIG. 9A), such as for example, independent counter-rotation 78 of each upper vane element 76a (see FIG. 5B) and lower vane element 76b (see FIG. 5B) in the air flow stream 72. As shown in FIG. 5B, each upper vane element 76a and lower vane element 76b may be positioned in the parallel position 86 with respect to each other within the air intake chamber 62 and with respect to the rotorcraft centerline 37 (see FIG. 5A). There may be two or more vane elements 76 on each side of the air intake chamber 62 that counter-rotate in the air intake chamber 62 to generate a counter-torque force 82 (see FIGS. 8A-9B), and the vane elements 76 may be at a low drag 94 (see FIG. 5B) or at a high drag 96 (see FIG. 5B), depending on the air flow stream 72. In this embodiment, the air duct 98 is preferably positioned between the air intake chamber 62 and the one or more microjet propulsion device housings 84. The air flow stream 72 exits the air intake chamber 62 via at least one second opening 70 (see FIG. 5B), flows through the interior of the air duct 98, and then flows out of the air duct 98 via one or more openings 71 (see FIG. 5B) and into the one or more microjet propulsion device housings 84 and the one or more microjet propulsion devices 80. The air flow stream 72 then flows through the one or more microjet propulsion devices 80 in the one or more microjet propulsion device housings 84 and out of one or more openings 87 (see FIG. 5B).

In another embodiment, as shown in FIG. 6A, the vane elements 76 may be in the canted position 88 with respect to each other and with respect to the rotorcraft centerline 37 (see FIG. 5A) to counter or counteract a thrust force ($F_T$) 92 (see also FIG. 9A) from the one or more microjet propulsion devices 80. FIG. 6A is an illustration of a schematic top view of another embodiment of the counter-torque control assembly 60 of the disclosure with the vane elements 76 in the canted position 88. The air flow stream 72 flows into the air intake chamber 62 via first openings 66. The air flow stream 72 flows over the vane elements 76, through the air intake chamber 62, through the air duct 98, and out the second openings 70 to the one or more microjet propulsion devices 80 housed in the one or more microjet propulsion device housings 84. The air flow stream 72 then flows through the one or more microjet propulsion devices 80 and out the one or more openings 87.

FIG. 6B is an illustration of a schematic close-up side view of the circled portion 6B of FIG. 6A showing a force vector configuration 117 for the vane elements 76 (see FIG. 6A) in the canted position 88. The force vector configuration 117 may comprise a drag force vector 118 representing a drag force ($F_D$) 119 from the vane elements 76, a counter-rotation force vector 120 used to counter or counteract the rotation of the single main rotor 14 of the rotorcraft 30, and a propulsion force vector 122 to counter or counteract the propulsion or thrust force from the one or more microjet propulsion devices 80.

FIG. 6C is an illustration of a cross-sectional view taken along lines 6C-6C of FIG. 6A showing one embodiment of a high drag position 130a of the vane elements 76. FIG. 6C shows the air flow stream 72 flowing through first opening 66 toward the vane elements 76 attached to the one or more mechanical linkages 77. Each vane element 76 is free to move in an adjustable position 90 to achieve an increased drag force ($F_D$) 119 due to the air flow stream 72 being drawn through the one or more microjet propulsion devices 80 (see FIG. 6A).

FIG. 6D is an illustration of an alternate configuration of FIG. 6C showing another embodiment of a high drag position 130b and alternate positioning of the vane elements 76. FIG. 6D shows the air flow stream 72 flowing through first opening 66 toward the vane elements 76 attached to the one or more mechanical linkages 77. Each vane element 76 is free to move in an adjustable position 90 to achieve an increased drag force ($F_D$) 119 due to the air flow stream 72 being drawn through the one or more microjet propulsion devices 80 (see FIG. 6A).

FIG. 6E is an illustration of another alternate configuration of FIG. 6C showing an embodiment of a low drag position 132 of the vane elements 76. FIG. 6E shows the air flow stream 72 flowing through first opening 66 toward the vane elements 76 attached to the one or more mechanical linkages 77. Each vane element 76 is free to move in an adjustable position 90 to achieve an increased or decreased drag force ($F_D$) 119 due to the air flow stream 72 being drawn through the one or more microjet propulsion devices 80 (see FIG. 6A). FIGS. 6C and 6D are two embodiments of a high drag (force) position 130a, 130b, respectively, and FIG. 6E is an embodiment of a low drag (force) position 132. The magnitude of the drag force is proportional to the increased or decreased cross-sectional area of the vane element 76, due to its rotational adjustment, within the air flow stream 72 being drawn over it.

Figure 7A:
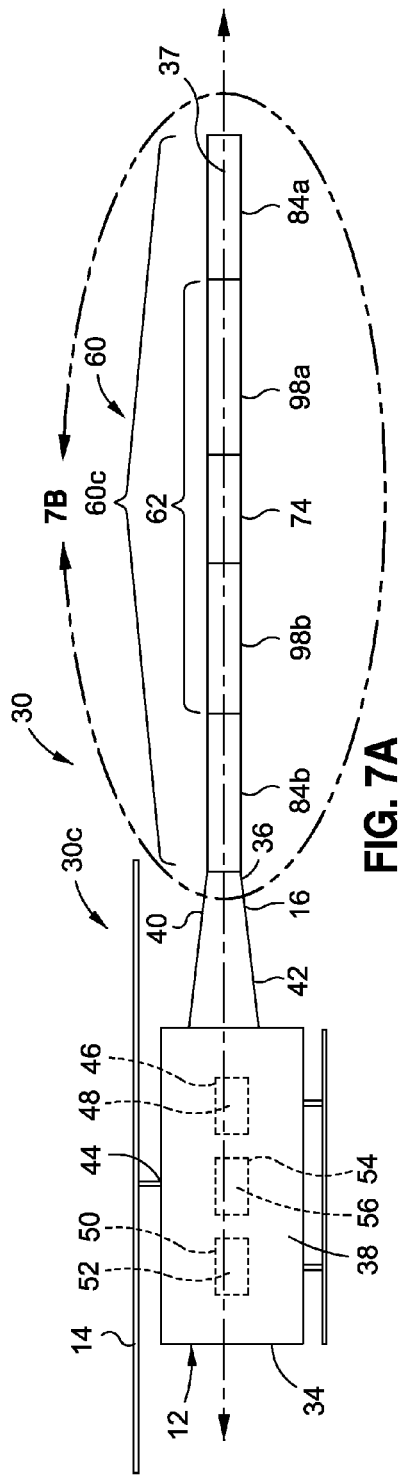
FIG. 7A is an illustration of a schematic side view of a rotorcraft incorporating yet another embodiment of a counter-torque control assembly of the disclosure.

FIG. 7A is an illustration of a schematic side view of a rotorcraft 30, in the form of rotorcraft 30c, incorporating another embodiment of a counter-torque control assembly 60, in the form of counter-torque control assembly 60c. As shown in FIG. 7A, the rotorcraft 30, in the form of rotorcraft 30c, comprises the airframe 12 having the forward end 34 and the aft end 36, the cabin 38, the tail boom 16 extending behind the cabin 38, and the rotorcraft centerline 37 extending through the rotorcraft 30c. The tail boom 16 has the aft end 40 and the forward end 42. The rotorcraft 30 preferably has the single main rotor 14 and no tail rotor and no tail fin. The single main rotor 14 is attached to and extends from the top portion 44 of the airframe 12 above the cabin 38. The airframe 12 of the rotorcraft 30, in the form of rotorcraft 30c, further comprises the first portion 46 having the primary propulsion system 48, such as a primary engine 49 (see FIG. 9A) or another suitable primary propulsion system, the second portion 50 having the flight control system 52, and the third portion 54 having the power system 56, such as an electrical power system 57 (see FIG. 9A) or another suitable power system.

As shown in FIG. 7A, the rotorcraft 30, in the form of rotorcraft 30c, further comprises in another embodiment, a counter-torque control assembly 60, in the form of counter-torque control assembly 60c, mounted to the aft end 40 of the tail boom 16. The counter-torque control assembly 60c comprises an air intake chamber 62, one or more rear microjet propulsion device housings 84a, and one or more front microjet propulsion device housings 84b. The air intake chamber 62 comprises a first air duct 98a adjacent the one or more rear microjet propulsion device housings 84a, a second air duct 98b adjacent the one or more front microjet propulsion device housings 84b, and the vane assembly 74 positioned between the first and second air ducts 98a, 98b. The counter-torque control assembly 60c comprises the additional one or more front microjet propulsion device housings 84b and additional one or more front microjet propulsion devices 80b (see FIG. 7B) positioned in front of the air intake chamber 62 to increase speed of the air flow stream 72 into the air intake chamber 62 and over the vane elements 76, and in turn, to increase the counter-torque force 82 (see FIG. 9A).

Figure 7B:
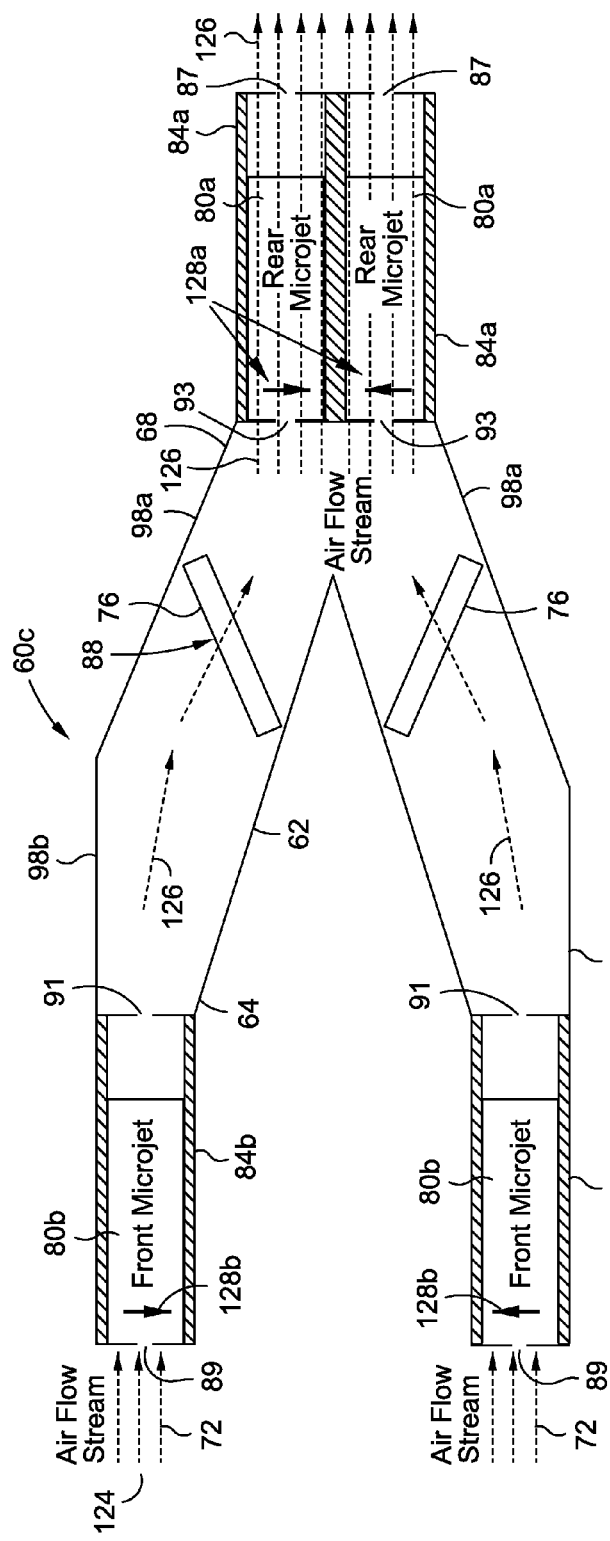
FIG. 7B is an illustration of a close-up top view of the circled portion 7B of FIG. 7A showing yet another embodiment of the counter-torque control assembly of the disclosure.

FIG. 7B is an illustration of a close-up top view of the circled portion 7B of FIG. 7A showing another embodiment of the counter-torque control assembly 60c of the disclosure. As shown in FIG. 7B, the air flow stream 72, in the form of ambient air flow 124, flows into the one or more front microjet propulsion device housings 84b and the one or more front microjet propulsion devices 80b via one or more openings 89. The air flow stream 72 then exits the one or more front microjet propulsion device housings 84b via one or more openings 91 (see FIG. 7B) and flows into the second air duct 98b of the air intake chamber 62. The air flow stream 72 is now in the form of an exhaust air flow 126 from the one or more front microjet propulsion devices 80b. The exhaust air flow 126 then flows through over the vane elements 76, shown in a canted position 88, and flows through the first air duct 98a. The exhaust air flow 126 then flows into the one or more rear microjet propulsion device housings 84a and through the one or more rear microjet propulsion devices 80a via one or more openings 93 (see FIG. 7B). The rear microjet propulsion devices 80a include a microjet fan blade rotation 128a (see FIG. 7B) and the air flow stream, in the form of exhaust air flow 126, exits the one or more rear microjet propulsion devices 80a via one or more openings 87 (see FIG. 7B).

Figure 12:
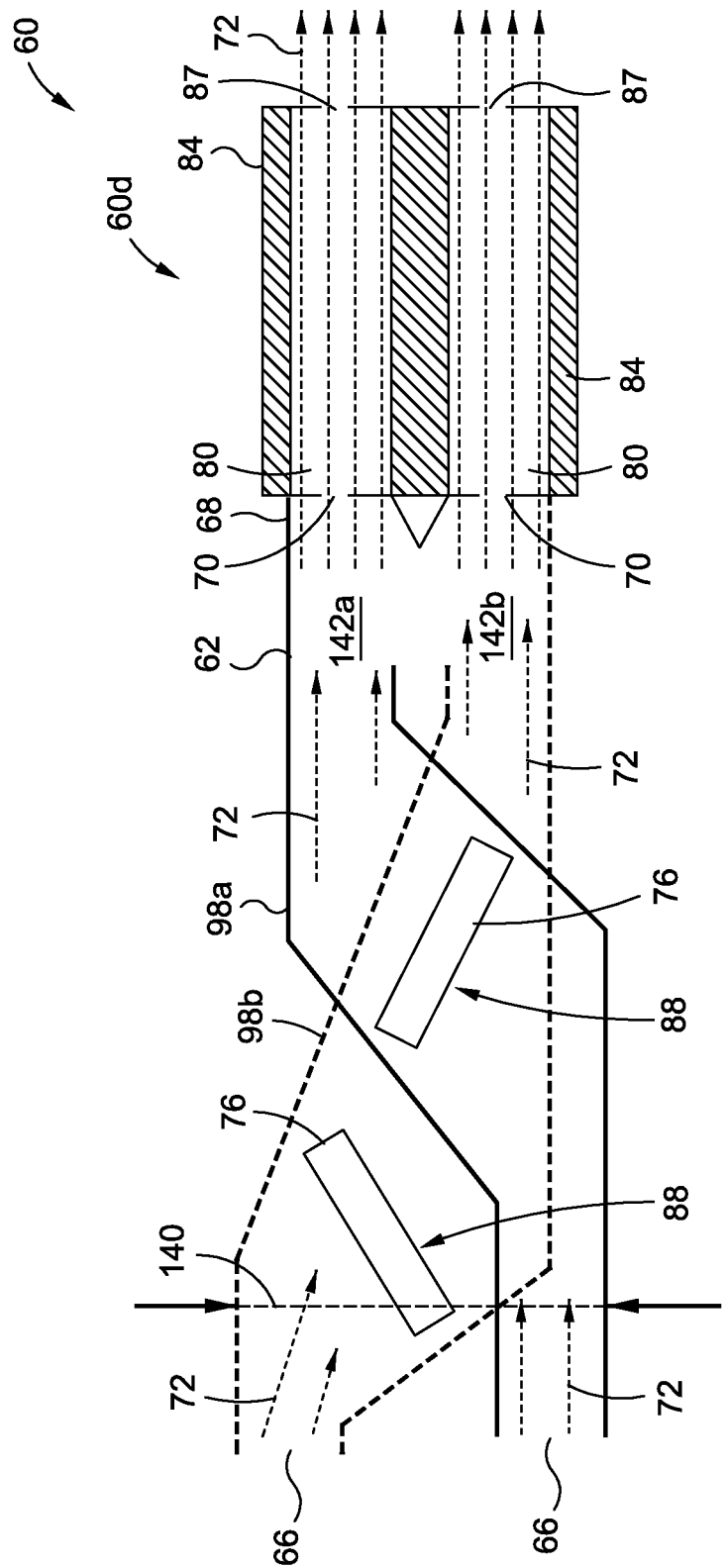

FIG. 12 is an illustration of a schematic top view of another embodiment of the counter-torque control assembly 60, in the form of counter-torque control assembly 60d. As shown in FIG. 12, the counter-torque control assembly 60, in the form of counter-torque control assembly 60d, comprises the air intake chamber 62 having one or more vane elements 76 in a first air duct 98a and one or more vane elements 76 in a second air duct 98b. Preferably, the first and second air ducts 98a, 98b and the respective vane elements 76 cross over each other and cross over the rotorcraft centerline 37 (see FIGS. 3A, 5A, 7A). The vane elements 76 may be in the canted position 88 with respect to each other and with respect to the rotorcraft centerline 37 (see FIGS. 3A, 5A, 7A). The counter-torque control assembly 60, in the form of counter-torque control assembly 60d, of this embodiment may have a smaller horizontal cross-section 140 (see FIG. 12), which may result in improved aerodynamics, and in particular, with high speed rotorcraft. Air flow streams 72 flow into the first and second air ducts 98a, 98b of the air intake chamber 62 via respective first openings 66. For example, one air flow stream 72 flows through the first air duct 98a and over the one or more vane elements 76, through a first channel area 142a of the air intake chamber 61, and out the second opening 70 to the one or more microjet propulsion devices 80 housed in the one or more microjet propulsion device housings 84. Similarly, another air flow stream 72 flows through the second air duct 98b and over the one or more vane elements 76, through a second channel area 142b of the air intake chamber 61, and out the second opening 70 to the one or more microjet propulsion devices 80 housed in the one or more microjet propulsion device housings 84. The air flow streams 72 then flow through the one or more microjet propulsion devices 80 and out the one or more openings 87.

Although the rotorcraft 30 shown in FIGS. 3A, 5A, 7A are generally representative of helicopters, the counter-torque control assembly 60, as disclosed herein, may also be employed in other types of rotorcraft or aircraft having a single main rotor 14 or needing a counter-torque control assembly 60, device, or system to counteract a torque 58 (see FIGS. 8A-9B) produced by a single main rotor 14 (see FIG. 1). More specifically, the teachings of the disclosed embodiments may be applied to other passenger rotorcraft or aircraft, cargo rotorcraft or aircraft, military rotorcraft or aircraft, and other types of rotorcraft or aerial vehicles.

Figure 8A:
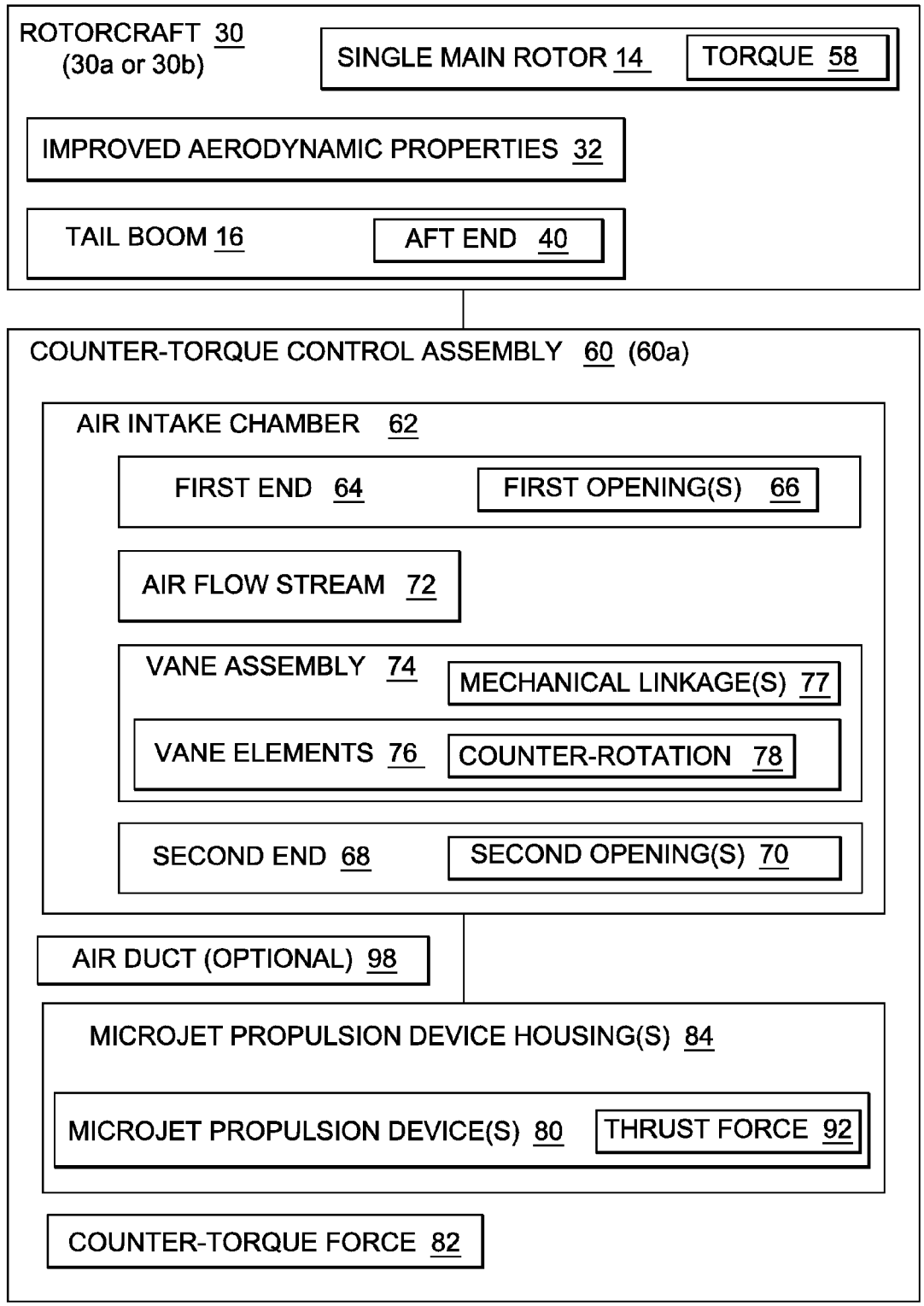
FIG. 8A is an illustration of a block diagram showing one of the embodiments of a counter-torque control assembly of the disclosure.

FIG. 8A is an illustration of a block diagram showing one of the embodiments of a counter-torque control assembly 60, such as in the form of counter-torque control assembly 60a. As shown in FIG. 8A, there is provided a counter-torque control assembly 60, such as in the form of counter-torque control assembly 60a, mounted to the tail boom 16. The counter-torque control assembly 60 comprises an air intake chamber 62 comprising a first end 64 configured for attachment to the aft end 40 of the tail boom 16, where the first end 64 has at least one first opening 66 for receiving an air flow stream 72. The counter-torque control assembly 60 further comprises a vane assembly 74 housed within the air intake chamber 62. The vane assembly 74 comprises at least two vane elements 76 capable of counter-rotation 78 in the air flow stream 72 and one or more mechanical linkages 77. The air intake chamber 62 further comprises a second end 68 with at least one second opening 70 (see also FIG. 4A) for the air flow stream 72 to exit from the air intake chamber 62. The counter-torque control assembly 60 further comprises one or more microjet propulsion devices 80 housed within one or more microjet propulsion device housings 84 coupled to a second end 68 of the air intake chamber 62. The one or more microjet propulsion devices 80 draws the air flow stream 72 over the vane elements 76 to generate a counter-torque force 82 to counter the torque 58 from the single main rotor 14. The vane elements 76 may counter or counteract a thrust force ($F_T$) 92 from the one or more microjet propulsion devices 80. The counter-torque control assembly 60 may optionally comprise an air duct 98. The rotorcraft 30, preferably in the form of rotorcraft 30a or 30b, preferably has improved aerodynamic properties 32 and preferably has no tail rotor 20 (see FIG. 1) and no tail fin 18 (see FIG. 1).

As shown in FIGS. 3A, 5A and 7A, the rotorcraft 30 further comprises an airframe 12 extending from a cabin 38 at a forward end 34 to a tail boom 16 at an aft end 36. The rotorcraft 30 further comprises a single main rotor 14 attached to and extending from a top portion 44 of the airframe 12, a primary propulsion system 48 located in a first portion 46 of the airframe 12, a flight control system 52 located in a second portion 50 of the airframe 12, and a power system 56 located in a third portion 54 of the airframe 12.

Figure 8B:
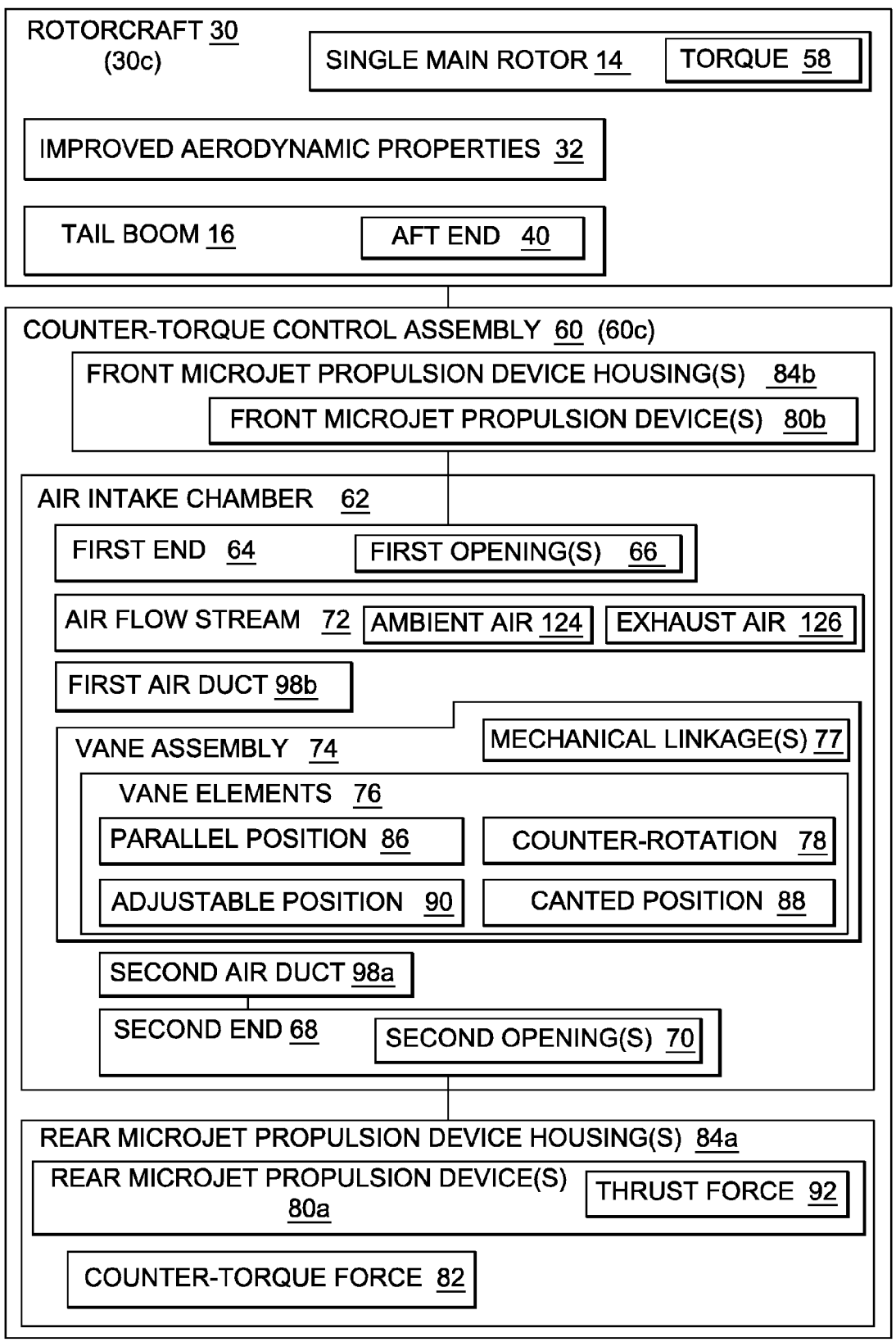
FIG. 8B is an illustration of a block diagram showing another one of the embodiments of a counter-torque control assembly of the disclosure.

FIG. 8B is an illustration of a block diagram showing another one of the embodiments of a counter-torque control assembly 60, such as in the form of counter-torque control assembly 60c. As shown in FIG. 8B, there is provided a counter-torque control assembly 60, such as in the form of counter-torque control assembly 60c, mounted to the tail boom 16. The counter-torque control assembly 60 comprises an air intake chamber 62 comprising a first end 64 configured for attachment to the aft end 40 of the tail boom 16, where the first end 64 has at least one first opening 66 for receiving an air flow stream 72. The air flow stream 72 may comprise ambient air 124 and/or exhaust air 126. The air intake chamber 62 further comprises a second end 68 with at least one second opening 70 (see also FIG. 4A) for the air flow stream 72 to exit from the air intake chamber 62. The counter-torque control assembly 60 further comprises a vane assembly 74 housed within the air intake chamber 62. The vane assembly 74 comprises at least two vane elements 76 capable of counter-rotation 78 in the air flow stream 72 and one or more mechanical linkages 77. In one embodiment, the vane elements 76 may be positioned in a parallel position 86 (see also FIG. 3B) with respect to each other within the air intake chamber 62. In another embodiment the vane elements 76 may be positioned in a canted position 88 (see also FIG. 6A) with respect to each other within the air intake chamber 62. The vane elements 76 may be in the canted position 88 with respect to each other to counter or counteract a thrust force ($F_T$) 92 from one or more rear microjet propulsion devices 80a. The vane elements 76 may also be moved in an adjustable position 90 (see also FIGS. 6C-6E). In this embodiment, the air intake chamber 62 may further comprise a first air duct 98a (see also FIG. 7B) and a second air duct 98b (see also FIG. 7B). The counter-torque control assembly 60 further comprises one or more front microjet propulsion devices 80b housed within one or more front microjet propulsion device housings 84b coupled to the first end 64 of the air intake chamber 62. The counter-torque control assembly 60 further comprises one or more rear microjet propulsion devices 80a housed within one or more rear microjet propulsion device housings 84a coupled to the second end 68 of the air intake chamber 62. The one or more rear microjet propulsion devices 80a may draw the air flow stream 72, such as in the form of exhaust air 126, over the vane elements 76 to generate a counter-torque force 82 to counter the torque 58 from the single main rotor 14. The rotorcraft 30, preferably in the form of rotorcraft 30c, preferably has improved aerodynamic properties 32 and preferably has no tail rotor 20 (see FIG. 1) and no tail fin 18 (see FIG. 1).

Figure 9A:
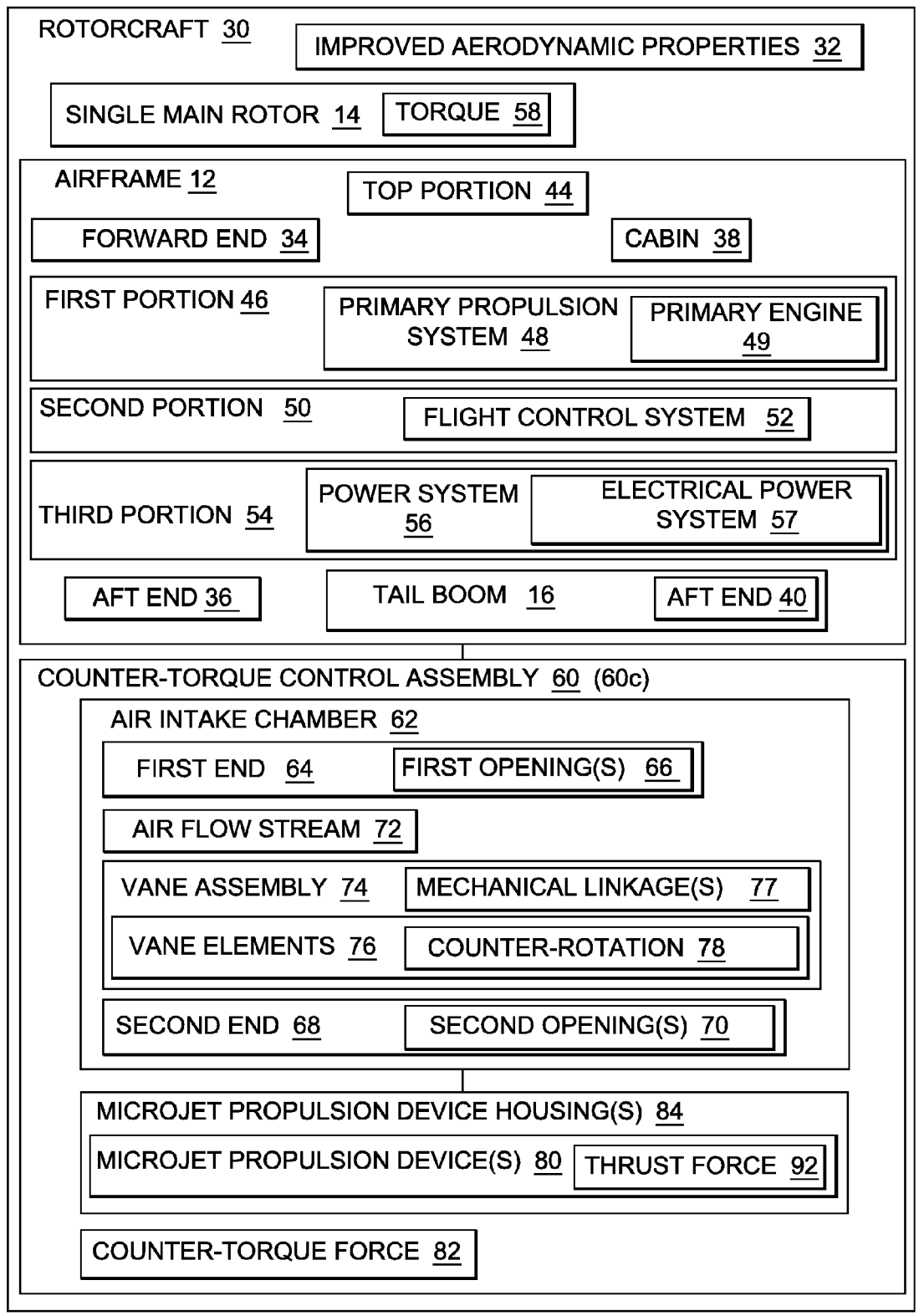
FIG. 9A is an illustration of a block diagram showing one of the embodiments of a rotorcraft of the disclosure incorporating an embodiment of a counter-torque control assembly of the disclosure.

FIG. 9A is an illustration of a block diagram showing one of the embodiments of a rotorcraft 30 of the disclosure incorporating an embodiment of a counter-torque control assembly 60 of the disclosure. As shown in FIG. 9A, there is provided a rotorcraft 30 with improved aerodynamic properties 32 and having no tail rotor 20 (see FIG. 1) and no tail fin 18 (see FIG. 1). The rotorcraft 30 comprises an airframe 12 extending from a cabin 38 at a forward end 34 to a tail boom 16 at an aft end 36. The rotorcraft 30 further comprises a single main rotor 14 attached to and extending from a top portion 44 of the airframe 12. The rotorcraft 30 further comprises a primary propulsion system 48, such as a primary engine 49, located in a first portion 46 of the airframe 12, a flight control system 52 located in a second portion 50 of the airframe 12, and a power system 56, such as an electrical power system 57, located in a third portion 54 of the airframe 12. The rotorcraft 30 further comprises a counter-torque control assembly 60, such as in the form of counter-torque control assembly 60c, mounted to an aft end 40 of the tail boom 16. The counter-torque control assembly 60 comprises an air intake chamber 62 comprising a first end 64 configured for attachment to the tail boom 16. The air intake chamber 62 further comprises at least a first opening 66 for receiving an air flow stream 72. The counter-torque control assembly 60 further comprises a vane assembly 74 housed within the air intake chamber 62. The vane assembly 74 comprises at least two vane elements 76 capable of counter-rotation 78 in the air flow stream 72 and one or more mechanical linkages 77. The air intake chamber 62 further comprises a second end 68 with at least one second opening 70 (see also FIG. 4A) for the air flow stream 72 to exit from the air intake chamber 62. The counter-torque control assembly 60 further comprises one or more microjet propulsion devices 80 housed within one or more microjet propulsion device housings 84 coupled to the second end 68 of the air intake chamber 62. The one or more microjet propulsion devices 80 draws the air flow stream 72 over the vane elements 76 to generate a counter-torque force 82 to counter a torque 58 from the single main rotor 14. The vane elements 76 may counter or counteract a thrust force ($F_T$) 92 from the one or more microjet propulsion devices 80.

Figure 9B:
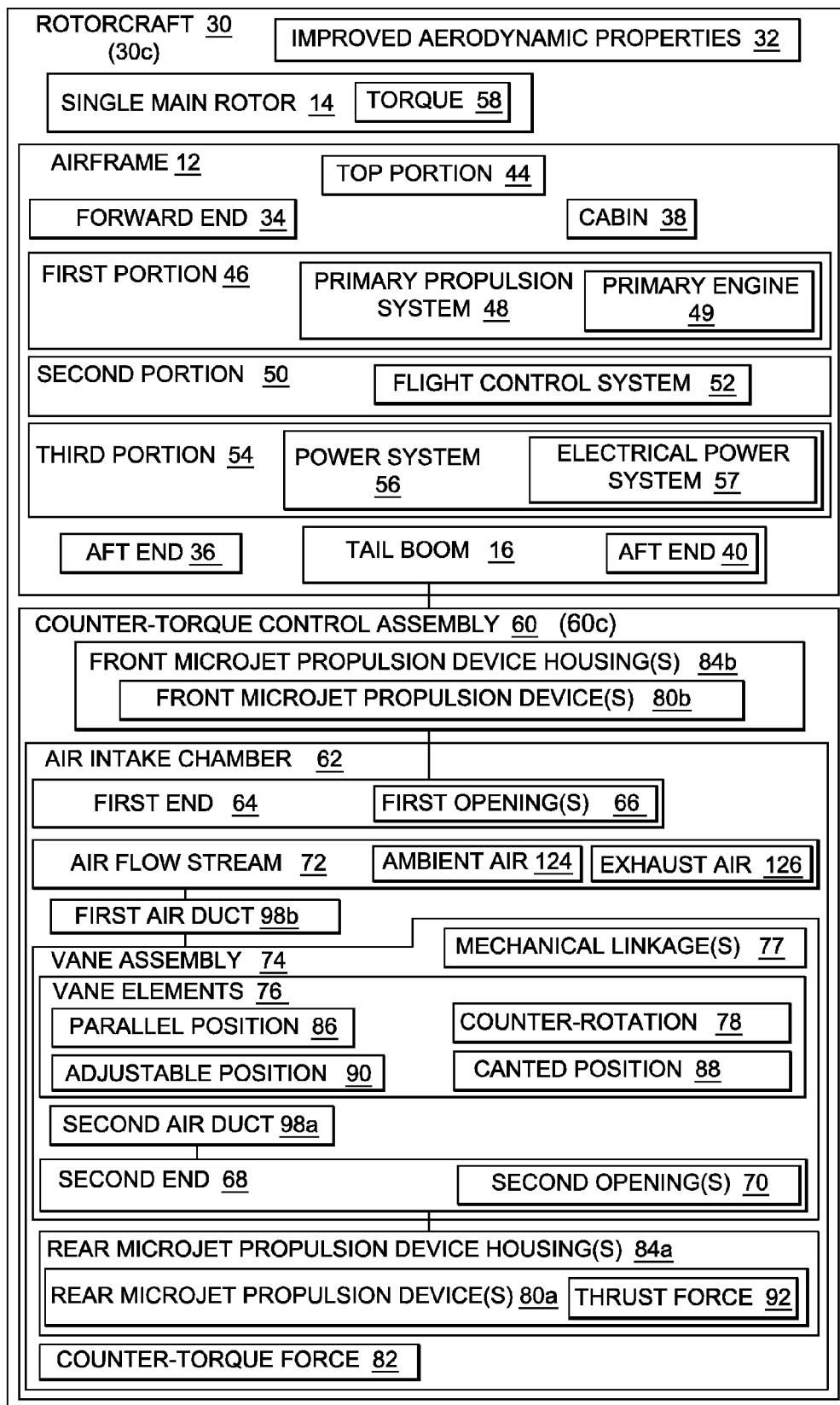
FIG. 9B is an illustration of a block diagram showing another one of the embodiments of a rotorcraft of the disclosure incorporating another embodiment of a counter-torque control assembly of the disclosure.

FIG. 9B is an illustration of a block diagram showing another one of the embodiments of a rotorcraft 30, such as rotorcraft 30c, of the disclosure incorporating another embodiment of a counter-torque control assembly 60, such as counter-torque control assembly 60c. As shown in FIG. 9B, there is provided a rotorcraft 30 with improved aerodynamic properties 32 and having no tail rotor 20 (see FIG. 1) and no tail fin 18 (see FIG. 1). The rotorcraft 30 comprises an airframe 12 extending from a cabin 38 at a forward end 34 to a tail boom 16 at an aft end 36. The rotorcraft 30 further comprises a single main rotor 14 attached to and extending from a top portion 44 of the airframe 12. The rotorcraft 30 further comprises a primary propulsion system 48, such as a primary engine 49, located in a first portion 46 of the airframe 12, a flight control system 52 located in a second portion 50 of the airframe 12, and a power system 56, such as an electrical power system 57, located in a third portion 54 of the airframe 12. The rotorcraft 30 further comprises a counter-torque control assembly 60, such as in the form of counter-torque control assembly 60c, mounted to an aft end 40 of the tail boom 16. The counter-torque control assembly 60 comprises an air intake chamber 62 comprising a first end 64 configured for attachment to the tail boom 16. The air intake chamber 62 further comprises at least a first opening 66 for receiving an air flow stream 72. The air flow stream 72 may comprise ambient air 124 and/or exhaust air 126. The air intake chamber 62 further comprises a second end 68 with at least one second opening 70 (see also FIG. 4A) for the air flow stream 72 to exit from the air intake chamber 62. The counter-torque control assembly 60 further comprises a vane assembly 74 housed within the air intake chamber 62. The vane assembly 74 comprises at least two vane elements 76 capable of counter-rotation 78 in the air flow stream 72 and one or more mechanical linkages 77. In one embodiment, the vane elements 76 may be positioned in a parallel position 86 (see also FIG. 3B) with respect to each other within the air intake chamber 62. In another embodiment the vane elements 76 may be positioned in a canted position 88 (see also FIG. 6A) with respect to each other within the air intake chamber 62. The vane elements 76 may be in the canted position 88 with respect to each other to counter or counteract a thrust force ($F_T$) 92 from one or more rear microjet propulsion devices 80a. The vane elements 76 may also be moved in an adjustable position 90 (see also FIGS. 6C-6E). In this embodiment, the air intake chamber 62 may further comprise a first air duct 98a (see also FIG. 7B) and a second air duct 98b (see also FIG. 7B). The counter-torque control assembly 60 further comprises one or more front microjet propulsion devices 80b housed within one or more front microjet propulsion device housings 84b coupled to the first end 64 of the air intake chamber 62. The counter-torque control assembly 60 further comprises one or more rear microjet propulsion devices 80a housed within one or more rear microjet propulsion device housings 84a coupled to the second end 68 of the air intake chamber 62. The one or more rear microjet propulsion devices 80a may draw the air flow stream 72, such as in the form of exhaust air 126, over the vane elements 76 to generate a counter-torque force 82 to counter the torque 58 from the single main rotor 14.

FIG. 10 is an illustration of a block diagram showing various microjet propulsion devices 80 that may be used in embodiments of the counter-torque control assembly 60 of the disclosure. As shown in FIG. 10, the one or more microjet propulsion devices 80 may preferably comprise a microjet gas turbine engine 100, a micro turbojet engine 102, a micro turbofan engine 104, a micro turboprop engine 106, a micro ramjet engine 108, a micro pulse jet engine 110, a micro scramjet engine 112, a radio control model jet engine 114, and a microjet electric motor engine 116.

Figure 11:
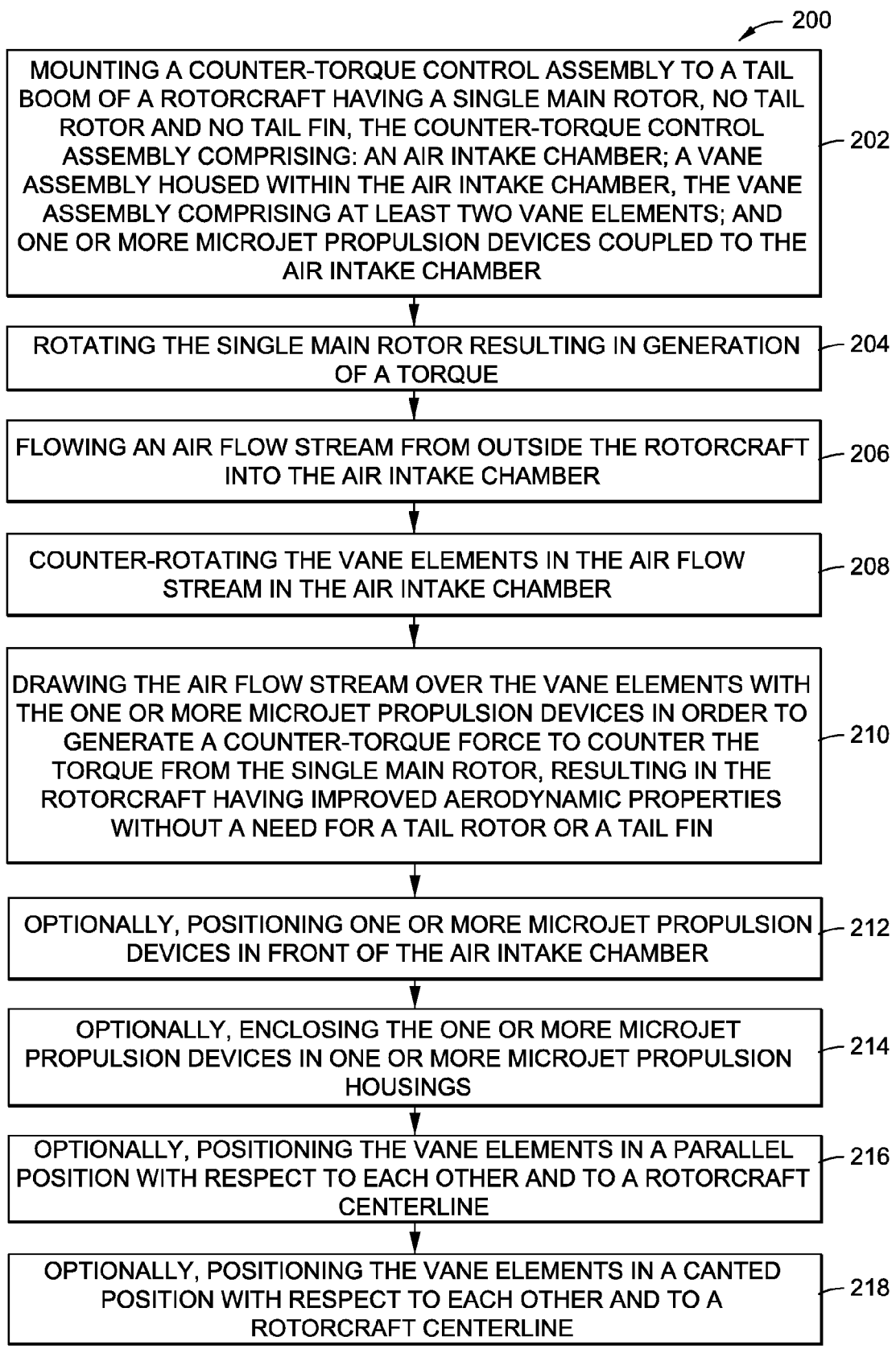
FIG. 11 is an illustration of a flow diagram showing an embodiment of a method of the disclosure; and, FIG. 12 is an illustration of a schematic top view of another embodiment of the counter-torque control assembly of the disclosure.

In another embodiment, there is provided a method 200 for improving aerodynamic properties 32 of a rotorcraft 30 by eliminating a tail rotor 20 (see FIGS. 1, 2) and a tail fin 18 (see FIG. 1). FIG. 11 is an illustration of a flow diagram showing an embodiment of the method 200 of the disclosure. As shown in FIG. 11, the method 200 comprises step 202 of mounting a counter-torque control assembly 60 (see FIGS. 3A, 5A, 6A, 7A) to a tail boom 16 (see FIGS. 3A, 5A, 6A, 7A) of a rotorcraft 30 (see FIGS. 3A, 5A, 6A, 7A) having a single main rotor 14 (see FIGS. 3A, 5A, 6A, 7A), no tail rotor 20 (see FIGS. 1, 2) and no tail fin 18 (see FIG. 1). As discussed above, the counter-torque control assembly 60 comprises an air intake chamber 62 (see FIGS. 3A, 4A, 5A, 6A, 7A), and a vane assembly 74 (see FIGS. 3B, 4A, 5B, 7A) housed within the air intake chamber 62. The vane assembly 74 comprises at least two vane elements 76 (see FIGS. 3B, 4A, 5B, 6A, 7B). The counter-torque control assembly 60 further comprises one or more microjet propulsion devices 80 (see FIGS. 3B, 5B, 6A) coupled to the air intake chamber 62. As shown in FIG. 10, the one or more microjet propulsion devices 80 may preferably comprise a microjet gas turbine engine 100, a micro turbojet engine 102, a micro turbofan engine 104, a micro turboprop engine 106, a micro ramjet engine 108, a micro pulse jet engine 110, a micro scramjet engine 112, a radio control model jet engine 114, and a microjet electric motor engine 116.

As shown in FIG. 11, the method 200 further comprises step 204 of rotating the single main rotor 14 to generate a torque 58 (see FIGS. 8A-9B). The method 200 further comprises step 206 of flowing an air flow stream 72 (see FIGS. 3B, 4A, 8A-9B) from the rotorcraft 30 into the air intake chamber 62.

As shown in FIG. 11, the method 200 further comprises step 208 of counter-rotating the vane elements 76 in the air flow stream 72 in the air intake chamber 62. The method 200 further comprises step 210 of drawing the air flow stream 72 over the vane elements 76 with the one or more microjet propulsion devices 80 resulting in generation of a torque, such as a counter-torque force 82 (see FIGS. 8A-9B), to counter or counteract the torque 58 from the single main rotor 14. This preferably results in the rotorcraft 30 having improved aerodynamic properties 32 (see FIGS. 8A-9B) due to eliminating the need for a tail rotor 20 (see FIGS. 1, 2) and a tail fin 18 (see FIG. 1).

As shown in FIG. 11, the method 200 may optionally further comprise step 212 of positioning one or more microjet propulsion devices 80, such as front microjet propulsion devices 80b (see FIG. 7B) in front of the air intake chamber 62 to increase speed of the air flow stream 72 into the air intake chamber 62 and over the vane elements 76, and in turn, to increase the counter-torque force 82. As shown in FIG. 11, the method 200 may optionally further comprise step 214 of enclosing the one or more microjet propulsion devices 80 in one or more microjet propulsion device housings 84 (see FIGS. 3B, 4B, 5B, 6A) to minimize any noise generated by the one or more microjet propulsion devices 80. As shown in FIG. 11, the method 200 may optionally further comprise step 216 of positioning the vane elements 76 in a parallel position 86 (see FIGS. 3B, 8B) with respect to each other and with respect to the rotorcraft centerline 37 (see FIG. 3A). As shown in FIG. 11, the method 200 may optionally further comprise step 218 of positioning the vane elements 76 in a canted position 88 (see FIGS. 6A, 8B) with respect to each other and with respect to the rotorcraft centerline 37 (see FIG. 5A) to counter or counteract a thrust force 92 (see FIG. 9A) from the one or more microjet propulsion devices 80.

Disclosed embodiments of the counter-torque control assembly 60 and method 200 provide improved aerodynamic properties by eliminating the tail rotor as well as the tail fin. In addition, there may be a thrust increase as the one or more microjet propulsion devices 80 are in-line with the direction of travel of the rotorcraft 30. Moreover, additional advantages include decreased weight of the rotorcraft and decreased noise of the rotorcraft. The vane elements 76 may also be permanently canted or movable to establish an angle relative to the rotorcraft centerline 37 (see FIGS. 3A, 5A, 7A) and in the direction of the one or more microjet propulsion devices 80 to provide an opposing force to the one or more microjet propulsion devices 80 if there is an issue with vertical takeoff or stationary hover. Disclosed embodiments of the counter-torque control assembly 60 and method 200 provide a method to counteract the torque 58 developed by the single main rotor 14 without the need for a tail rotor, which may adversely affect aerodynamic performance of the rotorcraft. Additionally, more propulsive thrust is available from the one or more microjet propulsion devices 80.

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting or exhaustive. Although specific terms are employed herein, they are used in a generic and descriptive sense only and not for purposes of limitation.

What is claimed is:

1. A counter-torque control assembly for mounting to a tail boom of a rotorcraft having a single main rotor, no tail rotor and no tail fin, the assembly comprising:
   an air intake chamber comprising a first end configured for attachment to a tail boom of a rotorcraft having a single main rotor, no tail rotor and no tail fin, the air intake chamber further comprising at least a first opening for receiving an air flow stream;
   a vane assembly housed within the air intake chamber, the vane assembly comprising at least two vane elements capable of counter-rotation in the air flow stream; and,
   one or more microjet propulsion devices enclosed in one or more microjet propulsion device housings and coupled to an aft end of the air intake chamber, the one or more microjet propulsion devices drawing the air flow stream over the vane elements to generate a counter-torque force to counter a torque from the single main rotor.

2. The assembly of claim 1 further comprising one or more microjet propulsion devices positioned in front of the first end of the air intake chamber to increase speed of the air flow stream into the air intake chamber and over the vane elements, and in turn, to increase the counter-torque force.

3. The assembly of claim 1 wherein said one or more microjet propulsion device housings for enclosing the one or more microjet propulsion devices minimize any noise generated by the one or more microjet propulsion devices.

4. The assembly of claim 1 wherein the vane elements are in a parallel position with respect to each other and with respect to a rotorcraft centerline.

5. The assembly of claim 1 wherein the vane elements are in a canted position with respect to each other and with respect to a rotorcraft centerline to counter a thrust force from the one or more microjet propulsion devices.

6. The assembly of claim 1 wherein the vane elements are moved to adjustable positions to achieve an increased drag force from the vane elements due to the air flow stream being drawn through the one or more microjet propulsion devices.

7. The assembly of claim 1 wherein the one or more microjet propulsion devices comprise at least one of a microjet gas turbine engine, a micro turbojet engine, a micro turbofan engine, a micro turboprop engine, a micro ramjet engine, a micro pulse jet engine, a micro scramjet engine, a radio control model jet engine, and a microjet electric motor engine.

8. The assembly of claim 1 wherein the assembly eliminates a need for a tail rotor and a tail fin on the rotorcraft, which, in turn results in improved aerodynamic properties of the rotorcraft.

9. A rotorcraft with improved aerodynamic properties and having no tail rotor and no tail fin, the rotorcraft comprising:
an airframe extending from a cabin at a forward end to a tail boom at an aft end;
a single main rotor attached to and extending from a top portion of the airframe;
a primary propulsion system located in a first portion of the airframe;
a flight control system located in a second portion of the airframe;
a power system located in a third portion of the airframe; and,
a counter-torque control assembly mounted to the tail boom, the assembly comprising:
an air intake chamber comprising a first end configured for attachment to the tail boom, the air intake chamber further comprising at least a first opening for receiving an air flow stream;
a vane assembly housed within the air intake chamber, the vane assembly comprising at least two vane elements capable of counter-rotation in the air flow stream; and,
one or more microjet propulsion devices enclosed in one or more microjet propulsion device housings and coupled to an aft end of the air intake chamber, the one or more microjet propulsion devices drawing the air flow stream over the vane elements to generate a counter-torque force to counter a torque from the single main rotor.

10. The rotorcraft of claim 9 further comprising one or more microjet propulsion devices positioned in front of the first end of the air intake chamber to increase speed of the air flow stream into the air intake chamber and over the vane elements, and in turn, to increase the counter-torque force.

11. The rotorcraft of claim 9 wherein said one or more microjet propulsion device housings for enclosing the one or more microjet propulsion devices minimize any noise generated by the one or more microjet propulsion devices.

12. The rotorcraft of claim 9 wherein the vane elements are in a position comprising a parallel position with respect to each other and with respect to a rotorcraft centerline, or a canted position with respect to each other and with respect to the rotorcraft centerline.

13. The rotorcraft of claim 9 wherein the vane elements are movable to achieve an increased thrust force from the one or more microjet propulsion devices.

14. The rotorcraft of claim 9 wherein the microjet propulsion device comprises a microjet gas turbine engine, a micro turbojet engine, a micro turbofan engine, a micro turboprop engine, a micro ramjet engine, a micro pulse jet engine, a micro scramjet engine, a radio control model jet engine, and a microjet electric motor engine.

15. A method for improving aerodynamic properties of a rotorcraft by eliminating a tail rotor and a tail fin, the method comprising:
mounting a counter-torque control assembly to a tail boom of a rotorcraft having a single main rotor, no tail rotor and no tail fin, the counter-torque control assembly comprising:
an air intake chamber;
a vane assembly housed within the air intake chamber, the vane assembly comprising at least two vane elements; and,
one or more microjet propulsion devices enclosed in one or more microjet propulsion device housings and coupled to an aft end of the air intake chamber;
rotating the single main rotor resulting in generation of a torque;
flowing an air flow stream from ambient air surrounding the rotorcraft into the air intake chamber;
counter-rotating the vane elements in the air flow stream in the air intake chamber;
drawing the air flow stream over the vane elements with the one or more microjet propulsion devices to generate a counter-torque force to counter the torque from the single main rotor, resulting in the rotorcraft having improved aerodynamic properties without a need for a tail rotor and a tail fin.

16. The method of claim 15 further comprising positioning one or more microjet propulsion devices in front of the air intake chamber to increase speed of the air flow stream into the air intake chamber and over the vane elements, and in turn, to increase the counter-torque force.

17. The method of claim 15 wherein the one or more microjet propulsion devices in one or more microjet propulsion device housings minimize any noise generated by the one or more microjet propulsion devices.

18. The method of claim 15 further comprising positioning the vane elements in a parallel position with respect to each other and with respect to a rotorcraft centerline.

19. The method of claim 15 further comprising positioning the vane elements in a canted position with respect to each other and with respect to a rotorcraft centerline to counter a thrust force from the one or more microjet propulsion devices.

20. The method of claim 15 wherein the one or more microjet propulsion devices comprise at least one of a microjet gas turbine engine, a micro turbojet engine, a micro turbofan engine, a micro turboprop engine, a micro ramjet engine, a micro pulse jet engine, a micro scramjet engine, a radio control model jet engine, and a microjet electric motor engine.

* * * * *